(12) United States Patent
Iyasu et al.

(10) Patent No.: US 6,410,177 B1
(45) Date of Patent: Jun. 25, 2002

(54) FUEL CELL HAVING GAS MANIFOLD

(75) Inventors: Kotaro Iyasu, Fuchu; Yoshitsugu Gocho, Fujisawa; Yoshihiro Moriyama; Akio Kano, both of Yokohama, all of (JP); Kazuhisa Tanaka, Newington, CT (US)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/559,911

(22) Filed: Apr. 28, 2000

Related U.S. Application Data

(63) Continuation of application No. PCT/JP98/04873, filed on Oct. 28, 1998.

(30) Foreign Application Priority Data

Oct. 28, 1997 (JP) ............................... 9-295519

(51) Int. Cl.$^7$ .................. H01M 8/04; H01M 8/12; H01M 2/00; H01M 2/02
(52) U.S. Cl. ......................................... 429/26; 429/84
(58) Field of Search ..................... 429/26, 34

(56) References Cited

U.S. PATENT DOCUMENTS 4,444,851 A * 4/1984 Maru ........................ 429/26
4,476,196 A * 10/1984 Poeppel et al. ............... 429/32
4,774,154 A * 9/1988 Singelyn et al. .............. 429/36
4,794,055 A * 12/1988 Matsumura et al. ........... 429/35

FOREIGN PATENT DOCUMENTS

| | | |
|---|---|---|
| JP | 60-3869 | 1/1985 |
| JP | 60-14767 | 1/1985 |
| JP | 61-216267 | 9/1986 |
| JP | 63-63960 | 4/1988 |
| JP | 64-81176 | 3/1989 |
| JP | 1-235164 | 9/1989 |
| JP | 2-15574 | 1/1990 |
| JP | 5-82154 | 4/1993 |
| JP | 7-254427 | 10/1995 |
| JP | 8-45531 | 2/1996 |
| JP | 8-241728 | 9/1996 |
| JP | 9-204926 | 8/1997 |

* cited by examiner

*Primary Examiner*—Stephen Kalafut
*Assistant Examiner*—Julian A. Mercado
(74) *Attorney, Agent, or Firm*—Oblon, Spivak, McClelland, Maier & Neustadt, P.C.

(57) ABSTRACT

Each of gas manifolds which are disposed on the side surfaces of a cell stack 10 is constituted by integrating a plate-like heat insulating member 21 disposed on the outer surface of the cell stack 10 and a heat and phosphoric acid resisting sheet member 20 joined to cover the inner and side surfaces of the heat insulating member 21.

9 Claims, 24 Drawing Sheets

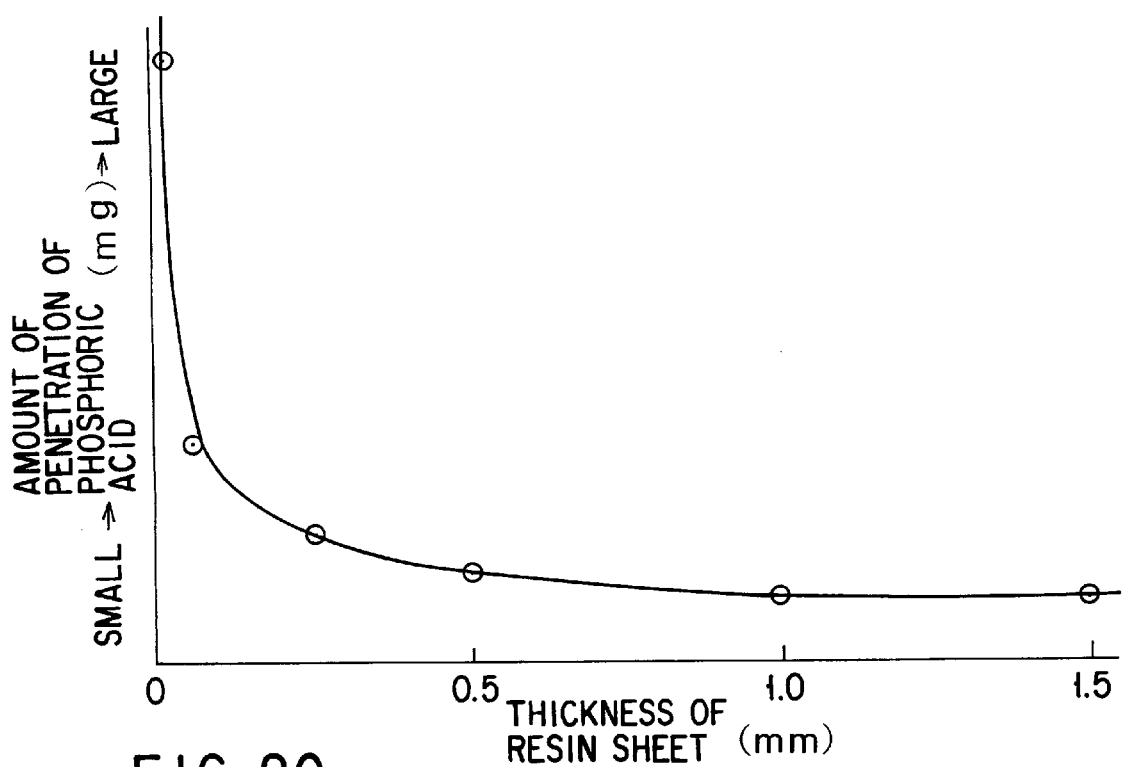
FIG. 20
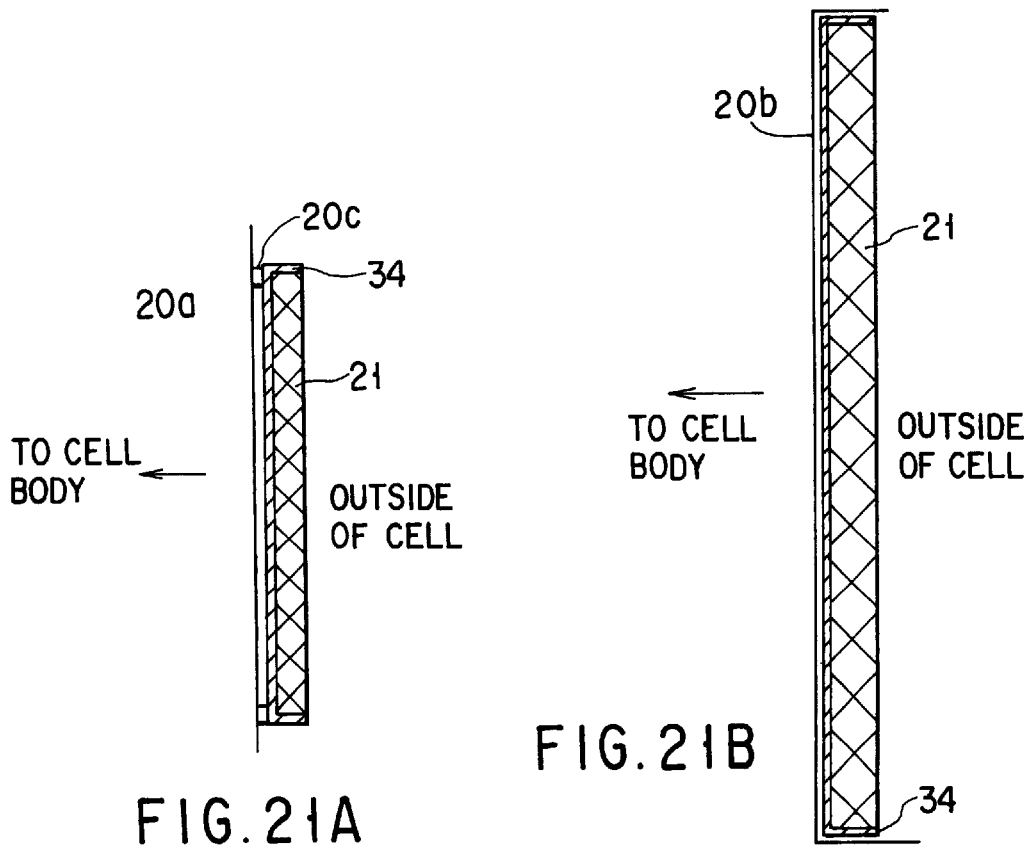
FIG. 21A
FIG. 21B

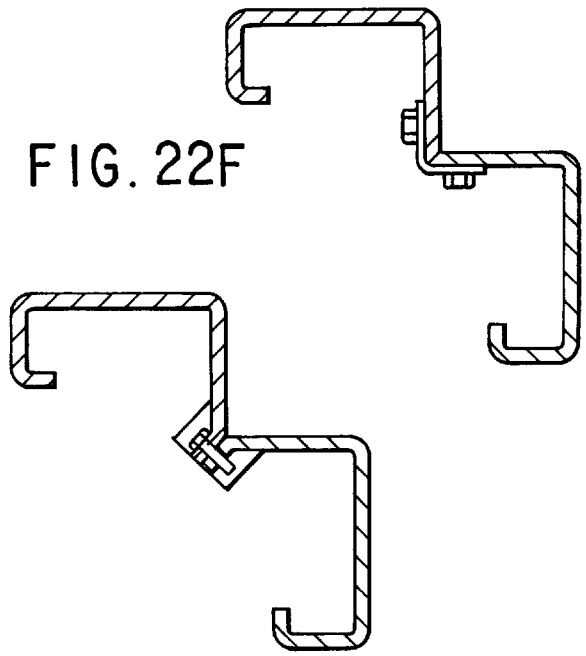
FIG. 22F
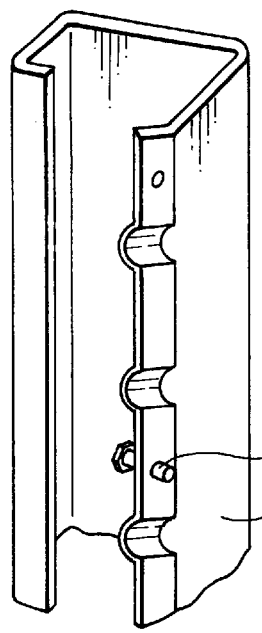
FIG. 22D
FIG. 22C
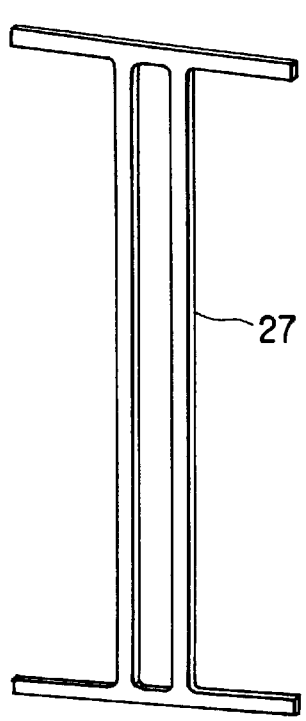
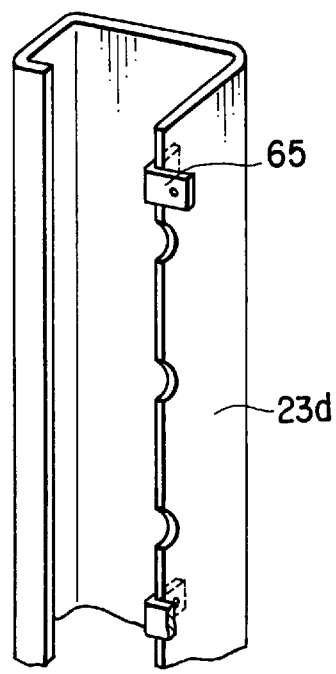
FIG. 22G  FIG. 22E

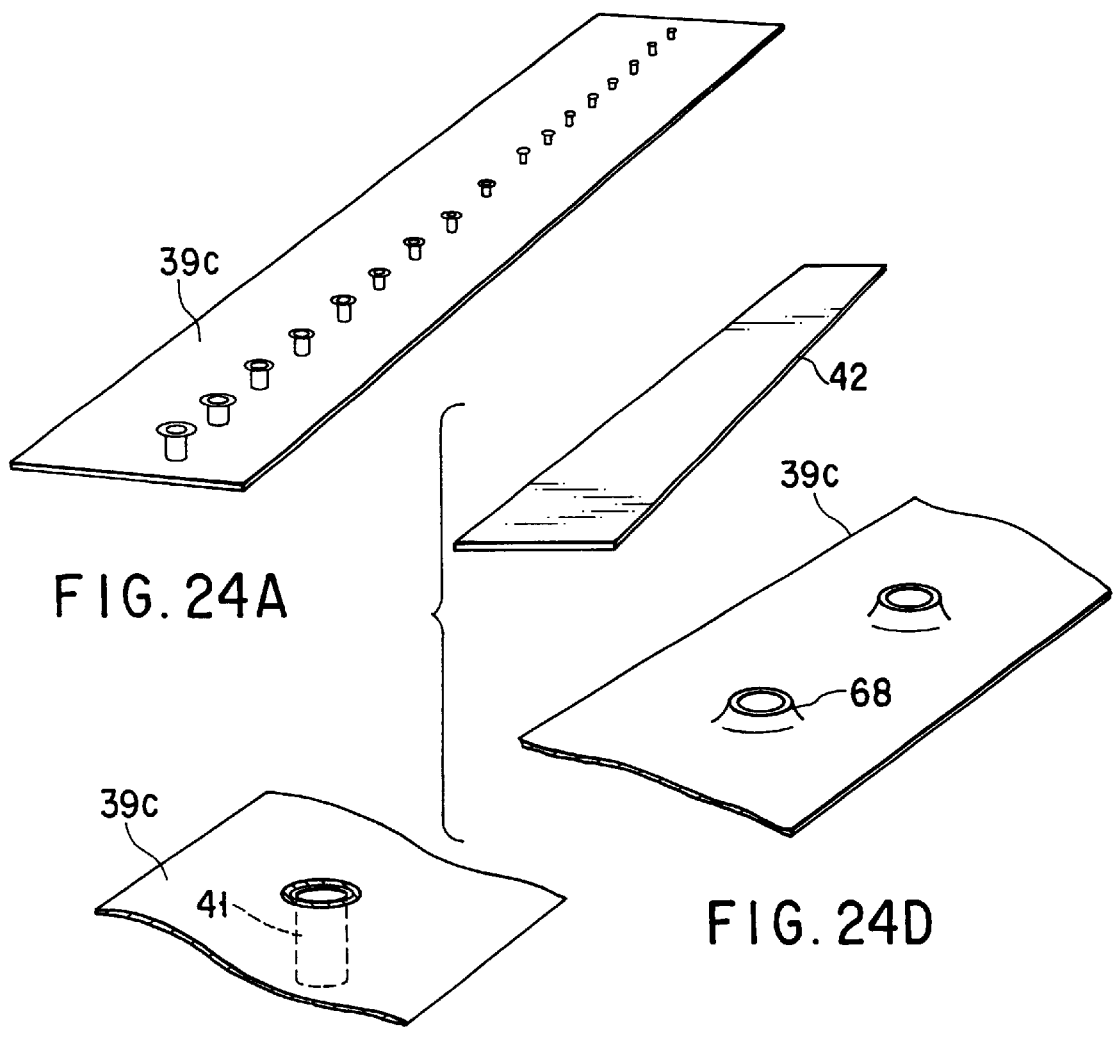
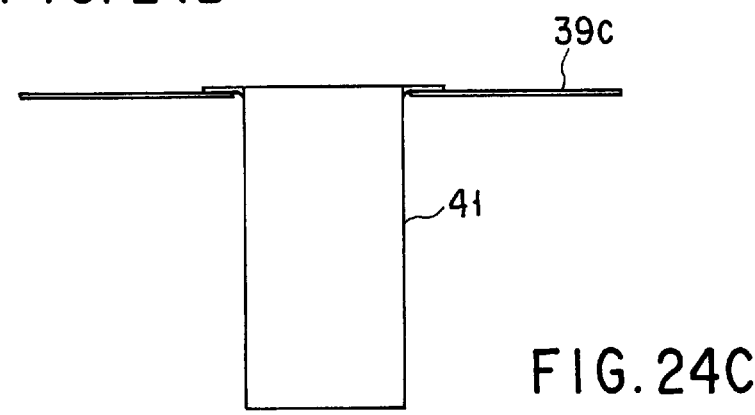
FIG. 24A
FIG. 24B
FIG. 24C
FIG. 24D

FUEL CELL HAVING GAS MANIFOLD

CROSS-REFERENCE TO RELATED APPLICATIONS

This is a Continuation Application of International Application No. PCT/JP98/04873, filed Oct. 28, 1998, the entire contents of which are incorporated herein by reference.

CROSS-REFERENCE TO RELATED APPLICATIONS

This application is based upon and claims the benefit of priority from the prior Japanese Patent Application No. 9-295519, filed Oct. 28, 1997, the entire contents of which are incorporated herein by reference.

BACKGROUND OF THE INVENTION

The present invention relates to a fuel cell, and more particularly to a fuel cell having improved gas manifolds in order to reduce the weight and cost thereof.

A fuel cell has a structure that hydrogen obtained by reforming hydrocarbon fuel, such as natural gas or methane gas, and air which is an oxidizer are supplied to the body of the fuel cell. As a result, electro-chemical reactions are caused to occur through an electrolyte, such as phosphate solution, so that electric energy is generated. A plurality of the single cells each having the power generating function are stacked so that a cell stack structure is formed.

FIG. 1 is an exploded perspective view showing a conventional cell stack structure of a fuel cell. That is, a single cell 1 of a fuel cell body is structured such that a fuel electrode 3, to which hydrogen is supplied in a direction indicated by an arrow A shown in FIG. 1, is disposed on either side of a matrix layer 2 having an electrolyte. Moreover, an air electrode 4 is disposed on the other side of the matrix layer 2, the air electrode 4 being supplied with air in a direction indicated by an arrow B shown in the drawing. Moreover, grooved electrode substrates 5 and 6 are stacked to interpose the fuel electrode 3 and air electrode 4. Moreover, a separator 7 is stacked adjacent to either of the grooved electrode substrate 5 or 6. A cooling plate 8 is stacked whenever a plurality of the single cells 1 are stacked so that one sub-stack 9 is formed. A multiplicity of the sub-stacks 9 are stacked so that a cell stack 10 is formed.

A clamping plate 11 is joined to each of the uppermost portion and the lowermost portion of the cell stack 10. The cell stack 10 and the upper and lower clamping plates 11 are clamed by tie rods 12 so that an integrated cell stack 13 is formed.

As shown in FIG. 2, a pair of fuel-gas manifolds 15a and 15b opposing to each other and a pair of air-gas manifolds 16a and 16b opposing to each other are joined to four side surfaces of the cell stack 13 structured as described above. Thus, fuel gas and air flow perpendicular to each other. A gasket 18 is disposed between the cell stack 13 and each of the gas manifolds 15a and 15b and air-gas manifolds 16a and 16b to prevent rise in a problem, such as deterioration in the power generating efficiently caused from leakage of air or the fuel gas.

The overall body of the conventional gas manifold is made of a metal material. Since the fuel cell is operated at high temperatures of about 200° C., great heat radiation takes place from the metal gas manifold. As a result, excessively great energy loss takes place. Therefore, a heat insulating material (not shown) is applied to the outer surface of each of the metal gas manifolds.

When fuel and air are supplied to the gas manifolds 15a and 16b respectively, a portion of the phosphoric acid, with which the matrix layer 2 of the single cell 1 and the grooved electrode substrates 5 and 6 forming the cell stack 10 are impregnated, is diffused in the flows of the fuel gas and air. As a result, the portion of the phosphoric acid is, in the form of steam of phosphoric acid, discharged to the outside of the cell stack (that is, to the inside portion of the gas manifolds).

Since the temperatures of the gas manifolds are somewhat lower than those of the cell stack, a portion of steam of the phosphoric acid discharged to the inside portions of the gas manifolds is, however, condensed and allowed to adhere to the inner walls of the gas manifolds. If the fuel gas and air containing phosphoric acid are brought into direct contact with the inner surfaces of the metal gas manifolds, the metal gas manifolds are vigorously eroded. As a result, holes are undesirably quickly formed.

To overcome the above-mentioned problem, a method of protecting the gas manifolds from phosphoric acid has been disclosed in Jpn. Pat. Appln. 4,950,563, in which the inner surfaces of the gas manifolds are coated with fluororesin.

However, the method of coating the inner surfaces of the gas manifolds with the fluororesin having the following problems cannot completely prevent erosion of the gas manifolds by dint of the phosphoric acid.

That is, the method of coating the inner surfaces of the gas manifolds with the fluororesin suffers from a problem in that phosphoric acid is undesirably introduced through a pin hole. The coefficient of linear expansion of resin coating is about ten times that of the gas manifold. Therefore, the coating method encounters defective adhesion of the resin coating owning to repetition of change in the temperature caused from start and interruption of the operation and change in the load. Therefore, there arises a problem in that the coating is separated.

Since the coating has a relatively small thickness, the phosphoric acid can easily penetrate the coating. Therefore, there arises a problem in that the matrix is eroded and realized reliability is unsatisfactory. To improve the reliability of the coating, the thickness of the coating film must be enlarged. Therefore, heating, coating and cooling processes must be repeated many times. As a result, a long time and great labor are required to complete the above-mentioned processes. Since the coating process and the process for manufacturing the gas manifolds are performed in series, the manufacturing process cannot be shortened.

In addition to the above-mentioned problems, the conventional gas manifold made of a metal material and thus having a great weight must have strong joining and holding structures. Moreover, great clamping force is required. As a result, there arises a problem in that the cost cannot be reduced.

When the gas manifolds are inspected, the heat insulating materials must be separated. Then, the heavy gas manifolds disposed on the four side surfaces of the cell stack cell must be removed. Therefore, the inspection cannot easily be performed and a long time is required.

A first object of the present invention is to provide a fuel cell incorporating gas manifolds each having light weight and small cost.

A second object of the present invention is to provide a fuel cell having gas manifolds each having a simple structure and permitting inspection to easily be performed.

A third object of the present invention is to provide a fuel cell which is capable of preventing leakage of gas from a corner of a cell stack.

A fourth object of the present invention is to provide a fuel cell having gas manifolds with which areas for joining the gas manifolds to the cell stack can be reduced.

BRIEF SUMMARY OF THE INVENTION

To achieve the foregoing objects, according to concept 1 of the present invention, there is provided a gas manifold which is disposed on each of side surfaces of a cell stack, wherein each of the gas manifolds comprises: plate-like heat insulating structures disposed on the side surfaces of the cell stack to oppose each other; and corner members disposed in corners of the cell stack.

According to concept 1 of the invention having the above-mentioned structure is able to significantly reduce the weight as compared with the conventional structure in which the overall body of the gas manifold is made of a metal material. Since the weight can be reduced, assembly and decomposition can easily be performed. Since the channel-shape corner member is disposed at each corner, a stable shape of the gas manifold can be maintained. Moreover, uniform distribution of gas to the cell stack can be performed.

A gas manifold according to concept 2 of the present invention has a structure according to concept 1, wherein the heat insulating structure comprises an internal sheet member and an external heat insulating member which oppose the cell stack.

According to concept 2 of the present invention having the above-mentioned structure, the plate-like heat insulating structure which constitutes the gas manifold is composed of the sealing member and the heat insulating member. Moreover, the sheet member is constituted by a uniform and heat- and phosphoric acid resisting sheet. Therefore, phosphoric acid can reliably be blocked and the cost can be reduced.

A gas manifold according to concept 3 of the present invention has a structure according to concept 2, wherein the sheet member and the heat insulating member has a flange hole through which gas is communicated, and the sheet member has a cylindrical sleeve.

According to concept 3 of the present invention having the above-mentioned structure, the internal sealing member and the cylindrical sleeve are integrated. Therefore, the structure can be simplified. Moreover, phosphoric acid can reliably be blocked. Therefore, leakage of the phosphoric acid to the outside of the system can be prevented.

A gas manifold according to concept 4 of the present invention has a structure according to concept 1, further comprises a first sealing member disposed between the heat insulating structure and the corner member and a second sealing member disposed between the corner member and the cell stack.

According to concept 4 of the present invention having the above-mentioned structure, gas leak between the heat insulating structure and the corner member can reliably be prevented. Moreover, gas leak between the corner member and the cell stack can reliably be prevented.

A gas manifold according to concept 5 of the present invention has a structure according to concept 1, wherein the second sealing member is a frame-like member which is previously hermetically joined to the corner member.

According to concept 5 of the present invention having the above-mentioned structure, gas leak between the corner member and the cell stack can reliably be prevented. Moreover, the sealing member can easily be joined.

A gas manifold according to concept 6 of the present invention has a structure according to concept 1, further comprising upper and lower clamping plates for clamping the cell stack, wherein a planar size of each of the upper and lower clamping plates is larger than a planar size of the cell stack, corner portions of the upper and lower clamping plates have cut portions for receiving the corner members, and the corner members are disposed in the cut portions through cushion members.

According to concept 6 of the present invention having the above-mentioned structure, the gas manifold can easily be assembled. Moreover, sealing can reliably be established while erosion by dint of phosphoric acid is prevented. Since the cushion member having the same shape as that of the cut portion is disposed in the cut portion formed in each of the corner portions of the upper and lower clamping plates, the difference in the thermal expansion between the corner member and the cell body can be absorbed. Moreover, the gas can be sealed.

A gas manifold according to concept 7 of the present invention has a structure according to concept 1, wherein a portion of each of the upper and lower clamping plates projecting over the cell stack is subjected to a phosphoric-acid resisting process.

According to concept 7 of the present invention having the above-mentioned structure, erosion of the cell stack by dint of phosphoric acid and phosphoric acid steam can be prevented.

A gas manifold according to concept 8 of the present invention has a structure according to concept 1, wherein the phosphoric acid resisting process to which the projection portion of each of the upper and lower clamping plates over the cell stack is subjected is fluororesin coating.

According to concept 8 of the present invention having the above-mentioned structure, erosion of the cell stack by dint of phosphoric acid and phosphoric acid steam can reliably be prevented.

A gas manifold according to concept 9 of the present invention has a structure according to concept 1, wherein the phosphoric acid resisting process to which the projection portion of each of the upper and lower clamping plates over the cell stack is subjected is a lining of fluororesin film.

According to concept 9 of the present invention having the above-mentioned structure, erosion of the cell stack by dint of phosphoric acid and phosphoric acid steam can reliably be prevented.

A gas manifold according to concept 10 has a structure according to concept 1, wherein the phosphoric acid resisting process to which the projection portion of each of the upper and lower clamping plates over the cell stack is subjected is a lining of fluorine rubber sheet.

According to concept 10 of the present invention having the above-mentioned structure, erosion of the cell stack by dint of phosphoric acid and phosphoric acid steam can reliably be prevented.

A gas manifold according to concept 11 of the present invention has a structure according to concept 1, wherein a space is formed among the heat insulating structure, the corner member and the cell stack by performing clamping with a clamping member.

According to concept 11 of the present invention having the above-mentioned structure, the heat insulating structure, the corner member and the cell stack can easily and quickly be clamped while a space is being formed among the foregoing elements.

A gas manifold according to concept 12 of the present invention has a structure according to concept 1, wherein the clamping member for clamping the heat insulating structure, the corner member and the cell stack such that a space is formed among the foregoing elements is structured such that ends of angled structures arranged to hold four heat insulating structures corresponding to four side surfaces of the cell stack from rear positions are connected to one another between the heat insulating structures among the four corners by studs through disc springs so as to be clamped.

According to concept 12 of the present invention having the above-mentioned structure, the heat insulating structure, the corner member and the cell stack can easily be clamped while a space is being formed among the foregoing elements.

A gas manifold according to concept 13 of the present invention has a structure according to concept 1, wherein the clamping member for clamping the heat insulating structure, the corner member and the cell stack such that a space is formed among the foregoing elements is structured such that the portions among four heat insulating structures corresponding to the side surfaces of the cell stack are clamped by U-arm toggle clamps in place of the disc springs and studs.

According to concept 13 of the present invention having the above-mentioned structure, the heat insulating structure, the corner member and the cell stack can easily and quickly be clamped while a space is being formed among the foregoing elements.

A gas manifold according to concept 14 of the present invention has a structure according to concept 1, wherein the clamping member for clamping the heat insulating structure, the corner member and the cell stack such that a space is formed among the foregoing elements is structured such that the portion around the four heat insulating structures corresponding to the side surfaces of the cell stack are clamped by a thin stainless steel band and spring buckles.

According to the concept 14 of the present invention having the above-mentioned structure, the heat insulating structure, the corner member and the cell stack can easily and quickly be clamped while a space is being formed among the foregoing elements.

A gas manifold according to concept 15 has a structure according to concept 1, a center clamping structure is provided for each of centers of upper and lower surfaces of the heat insulating structure and centers of upper and lower clamping plates opposing the centers of the upper and lower surfaces.

According to concept 15 of the present invention having the above-mentioned structure, the overall portion of the heat insulating structure including the upper and lower portions can averagely be clamped while a space is being formed among the foregoing elements.

A gas manifold according to concept 16 of the present invention has a structure according to concept 1, wherein supports for locating the vertical positions of the heat insulating structures and jack bolts which are capable of moving and adjusting the heat insulating structures are provided for four corners of the lower clamping plate.

According to concept 16 of the present invention having the above-mentioned structure, locating can easily be performed when the heat insulating structures are joined. Thus, the workability can be improved.

A gas manifold according to concept 17 of the present invention has a structure according to concept 2, wherein the heat insulating member is constituted by inserting a heat insulating material into a heat-insulating-material holding frame.

According concept 17 of the present invention having the above-mentioned structure, the heat insulating material can easily be held. In addition, the overall mechanical strength can be increased. Thus, the heat insulating material can uniformly be clamped onto the side surface of the cell stack. Therefore, the sealing performance can significantly be improved.

A gas manifold according to concept 18 of the present invention has a structure according to concept 17, wherein the sheet member is formed into a plate-like shape which is larger than the heat-insulating-material holding frame.

According to claim 18 of the present invention having the above-mentioned structure, satisfactory insulation can be realized with a simple structure and, thus, the workability can be improved.

A gas manifold according to concept 19 of the present invention has a structure according to concept 17, wherein the sheet member is molded into a box-like shape to fit to the shape of the heat-insulating-material holding frame.

According to concept 19 of the present invention having the above-mentioned structure, the heat and phosphoric acid resisting sheet can previously be molded into the box-like shape to fit to the shape of the heat-insulating-material holding frame. Therefore, the sheet member can be manufactured in a process which is individual from a process for manufacturing the gas manifold. Therefore, time required to manufacture the gas manifold can be shortened.

A gas manifold according to concept 20 of the present invention has a structure according to concept 2, wherein the sealing member is composed of at least one or more types of a PFA (tetrafluoroethylene and perfuloroalkoxyethylene copolymer) resin sheet, a PTFE (tetrafluoroethylene) resin sheet and a FEP (tetrafluoroethylene and propylene hexafluoride copolymer) resin sheet.

According to concept 20 of the present invention having the above-mentioned structure, a sealing member can be formed through which phosphoric acid cannot considerably penetrate and which has excellent heat resistance and mechanical strength.

A gas manifold according to concept 21 of the present invention has a structure according to concept 2, wherein the thickness of the sheet member is not shorter than 0.1 mm nor longer than 1 mm.

According to concept 21 of the present invention having the above-mentioned structure, the amount of penetration of phosphoric acid can be reduced. Thus, a sealing member having excellent mechanical strength and electric insulation can be formed.

A gas manifold according to concept 22 of the present invention has a structure according to concept 2, wherein the sealing member is loosely joined to the heat insulating member.

According to concept 22 of the present invention having the above-mentioned structure, the sheet member comprising the heat and phosphoric acid resisting sheet is not secured to the inner surface of the heat-insulating-material holding frame opposing the cell stack. Since the sheet member is loosely joined to the inner surface, the difference in the thermal expansion between the heat-insulating-material holding frame and the sealing member can be absorbed.

A gas manifold according to concept 23 of the present invention has a structure according to concept 2, wherein the sheet member is composed of at least one or more resin sheets.

According to concept 23 of the present invention having the above-mentioned structure, the amount of penetration of phosphoric acid can reliably by reduced. If a pinhole is formed in one sheet and thus phosphoric acid penetrates the sheet, the residual sheets are able to block the phosphoric acid. Therefore, the reliability can significantly be improved. Since the plural resin sheets are employed, air layers formed among the sheets enable a further excellent heat insulating effect to be obtained.

A gas manifold according to concept 24 of the present invention has a structure according to concept 2, wherein the corner member is made of a metal material or FRP and the inner surface of the corner member is applied with a liner sheet which is any one of a PFA (tetrafluoroethylene and perfuloroalkoxyethylene copolymer) resin sheet, a PTFE (tetrafluoroethylene) resin sheet and a FEP (tetrafluoroethylene and propylene hexafluoride copolymer) resin sheet.

According to concept 24 of the present invention having the above-mentioned structure, the corner members constituting the side portions of the gas manifold are made of the metal material or FRP so that the mechanical strength of the corner member is decreased. Therefore, the shape of the gas manifold can completely be maintained. Therefore, the gas can uniformly be distributed to the cell stack. Since the corner member is applied with the liner sheet, erosion of the corner member by dint of phosphoric acid can be prevented and deterioration in the mechanical strength of the corner member can be prevented.

A corner member according to concept 25 of the present invention has a structure according to concept 24, wherein a corner member which is disposed in the portion of a cooling plate inserted into the cell stack from which an outlet pipe is extended has a structure which is separable horizontally along the corner of the cell stack.

According to concept 25 of the present invention having the above-mentioned structure, the outlet pipe does not obstruct the operation for disposing the corner member to the corner of the cooling plate of the cell stack from which the outlet pipe is extended. Therefore, installation can easily be performed. Moreover, repair can be performed such that the corner member is removed without a necessity of disconnecting the pipe connected to the outlet pipe.

A gas manifold according to concept 26 of the present invention has a structure according to concept 13, wherein a corner member of the corner members which is disposed in the portion of a cooling plate inserted into the cell stack from which an outlet pipe is extended has through holes formed at positions corresponding to the positions of the outlet pipes, holes each of which is smaller than the through holes in the corner member are formed at positions of the corner member corresponding to the liner sheet, and a soft sealing member is disposed around the outlet pipe.

According to concept 26 of the present invention having the above-mentioned structure, the soft sealing members are disposed between the through holes formed at predetermined positions of the corner member and the outlet pipes. Therefore, when the gas manifold is strongly clamped, the soft sealing members overflow the through holes. Thus, the boundaries between the through holes and the outlet pipes can be sealed.

A gas manifold according to concept 27 of the present invention has a structure according to concept 14, wherein the soft sealing member is a disc-like sponge rubber, a hole smaller than the outlet pipe is formed in the central portion of the disc-like sponge rubber, a circumferential slit is formed in the central portion of the disc-like sponge rubber in a direction of the thickness of the disc-like sponge rubber, and the liner sheet is inserted into the slit.

According to concept 27 of the present invention having the above-mentioned structure, the elasticity of the sponge rubber enables the gap between the through hole and the outlet pipe to reliably be sealed.

A gas manifold according to concept 28 of the present invention has a structure according to concept 13, wherein a corner member of the corner members which is disposed in the portion of a cooling plate inserted into the cell stack from which an outlet pipe is extended has through holes formed at positions corresponding to the positions of the outlet pipes, and sleeves for inserting the outlet pipes are formed at positions corresponding to the liner sheet.

According to concept 28 of the present invention having the above-mentioned structure, gas leak from the through hole for the outlet pipe of the corner member can reliably be prevented.

A gas manifold according to concept 29 of the present invention has a structure according to concept 15, wherein a corner member of the corner members which is disposed in the portion of a cooling plate inserted into the cell stack from which an outlet pipe is extended has through holes formed at positions corresponding to the positions of the outlet pipes, also through holes are formed at positions corresponding to the liner sheet and the portions around the through holes are flare-machined for inserting the outlet pipes.

According to concept 29 of the present invention having the above-mentioned structure, gas leak from the through holes for the outlet pipes formed in the corner member can reliably be prevented.

A gas manifold according to concept 30 of the present invention has a structure according to concept 15, wherein the sleeve formed in the liner sheet and arranged to insert the outlet pipe and the outlet pipe are clamped such that the corner members are assembled after which a sealing member is provided around the outlet pipe and a band is used to clamp the outside.

According to concept 30 of the present invention having the above-mentioned structure, gas leak from the through hole of the corner member for the outlet pipe can reliably be prevented.

A gas manifold according to concept 31 of the present invention has a structure according to concept 1, wherein a sealing groove is formed in the corner member adjacent to the cell body, and a projection is formed on the outer surface of the corner member.

According to concept 31 of the present invention having the above-mentioned structure, the portion between the corner member and the cell body can reliably be sealed. Since the outward projection portion is provided, shift of the heat insulating structure can be prevented.

A gas manifold according to concept 32 of the present invention has a structure according to concept 17, wherein the heat insulating material which constitutes the heat insulating member has a thermal conductivity of 0.08 (W/m·K) at 25° C.

According to concept 32 of the present invention having the above-mentioned structure, the heat insulating material having the low thermal conductivity is employed. Therefore, heat generated from the cell can reliably be insulated. Thus, the heat insulating efficiency can be improved.

A gas manifold according to concept 33 of the present invention has a structure according to concept 17, wherein the heat insulating material which constitutes the heat insulating member has a density of 0.2 g/cm³.

According to concept 33 of the present invention having the above-mentioned structure, the heat insulating material having the low density is employed. Therefore, the weight of the gas manifold can reliably be reduced.

A gas manifold according to concept 34 of the present invention has a structure according to concept 17, wherein the heat insulating material which constitutes the heat insulating member has a compressibility of 10% or lower when the compressive load is 200 kg/m².

According to concept 34 of the present invention having the above-mentioned structure, use of the heat insulating material having the low compressibility enables substantially constant thermal conductivity to be realized because the compressibility is not changed considerably even if the pressure of the fuel gas or the oxidizer gas is somewhat changed. Therefore, a heat insulating effect can reliably be obtained.

A gas manifold according to concept 35 of the present invention has a structure according to concept 17, wherein the heat insulating material which constitutes the heat insulating member is composed of a plurality of heat insulating material layers made of at least one type of materials and having different strengths.

According to concept 35 of the present invention having the above-mentioned structure, the heat insulating material is composed of the plural heat insulating material layers. Thus, the characteristics of the heat insulating materials can be used. Therefore, a heat insulating material having a good balance and exhibiting excellent heat insulating performance and satisfactory mechanical strength can be obtained.

A gas manifold according to concept 36 of the present invention has a structure according to concept 35, wherein the heat insulating material which constitutes the heat insulating member is arranged such that a heat insulating material having excellent heat insulation is disposed on the inside (a portion adjacent to the cell body) and a heat insulating material having increased mechanical strength is disposed on the outside.

According to concept 36 of the present invention having the above-mentioned structure, a heat insulating member having excellent heat insulation and mechanical strength can be formed.

A gas manifold according to concept 37 of the present invention has a structure according to concept 35, wherein the heat insulating material which constitutes the heat insulating member is arranged such that a low density heat insulating material composed of fibrous substances having excellent heat insulation is disposed on the inside (portion adjacent to the cell body) and a low-density heat insulating material having a structure containing bubbles, which have excellent mechanical strength, is disposed on the outside.

According to concept 37 of the present invention having the above-mentioned structure, excellent heat insulation and mechanical strength can be obtained. In addition, the weight can be reduced.

A gas manifold according to concept 38 of the present invention has a structure according to concept 17, wherein the thickness of the heat insulating material which constitutes the heat insulating member is 10 mm or smaller.

According to concept 38 of the present invention having the above-mentioned structure, the thickness of the heat insulating material can be reduced. Thus, the size can reliably be reduced as compared with the conventional gas manifold.

A gas manifold according to concept 38 of the present invention has a structure according to concept 17, wherein the heat insulating material which constitutes the heat insulating member has a honeycomb structure, and the honeycomb is filled with the heat insulating material.

According to concept 39 of the present invention having the above-mentioned structure, the strength of the heat insulating material can reliably be increased. Therefore, a heat insulating material having excellent reliability for a long time can be provided.

A gas manifold according to concept 40 of the present invention has a structure according to concept 17, wherein two sides of the heat insulating material constituting the heat insulating member are reinforced by first reinforcing members, and surfaces of the first reinforcing members are reinforced by second reinforcing members.

According to concept 40 of the present invention having the above-mentioned structure, the first reinforcing member, such as a plain lath, a hexagonal wire mesh or punching metal, enables the mechanical strength to be increased. Since the second reinforcing member, such as glass cloth, is used to cover the first reinforcing member, a crack of a sheet member formed by dint of an edge surface of the reinforcing member can be prevented. Thus, breakage caused from concentration of local stresses can be prevented. Thus, a heat insulating member exhibiting reliability for a long time can be provided.

A gas manifold according to concept 41 of the present invention has a structure according to concept 17, wherein the heat-insulating-material holding frame comprises a holding member for holding the clamping member.

According to concept 41 of the present invention having the above-mentioned structure, the holding member provided for the heat-insulating-material holding frame is able to prevent shift of the clamping member. As a result, stable clamping force can be maintained for a long time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 15A and 15B show an example of the structure of a heat insulating member which is an element of the gas manifold according to the present invention, in which FIG. 15A is a horizontal cross sectional view and FIG. 15B is a front view.

FIGS. 16A and 16B show another structure of the heat insulating member which is an element of the gas manifold according to the present invention, in which FIG. 16A is a horizontal cross sectional view and FIG. 16B is a vertical cross sectional view.

FIG. 20 is a graph showing the relationship between the thicknesses of the resin sheet and amounts of penetration of phosphoric acid.

FIGS. 21A and 21B are diagram showing a state in which the sheet member has been joined to the heat insulating member.

FIGS. 22A and 22B are perspective views showing the structure of the corner member and the liner sheet, in which FIG. 22A is a perspective view showing a corner member in the portion from which the outlet pipe of the cooling plate is not extended, and FIG. 22B is a perspective view showing a corner member in the portion from which the outlet pipe of the cooling plate is extended.

FIGS. 22C and 22E are perspective views showing a corner member having a structure which is separable laterally.

FIGS. 22D and 22F are horizontal cross sectional views showing the corner member having a structure which is separable laterally.

FIG. 22G is a schematic view showing the shape of a second sealing member.

FIGS. 23A and 23B show a state of sealing the corner portion in the portion of the cooling plate of the gas manifold from which the outlet pipe is extended, in which FIG. 23A is a horizontal cross sectional view and FIG. 23B is a vertical cross sectional view.

FIG. 24A is a perspective view showing the structure of a liner sheet of the corner member.

FIG. 24B is an enlarged view showing a sleeve portion for the pipe.

FIG. 24C is a cross sectional view showing the sleeve portion for the pipe.

FIG. 24D is a diagram showing a flare-machined liner sheet.

FIGS. 25A and 25B show a state of sealing established by clamping the corner portion of the cooling plate of the gas manifold from which the outlet pipe is extended, in which FIG. 25A is a horizontal cross sectional view and FIG. 25B is a vertical cross sectional view.

DETAILED DESCRIPTION OF THE INVENTION

Figure 1:
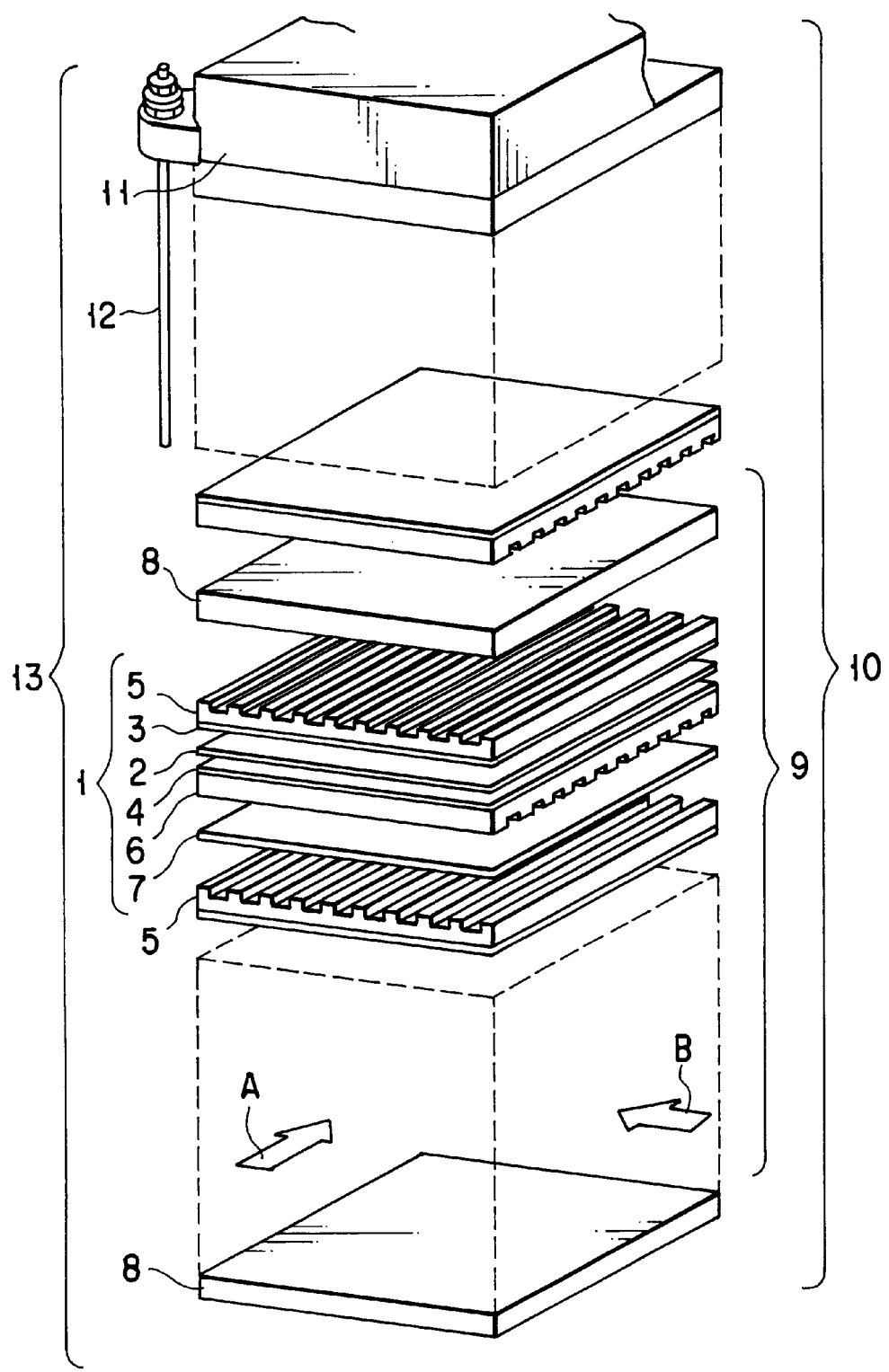
FIG. 1 is an exploded perspective view showing an example of the structure of a cell stack of a conventional fuel cell.
Figure 2:
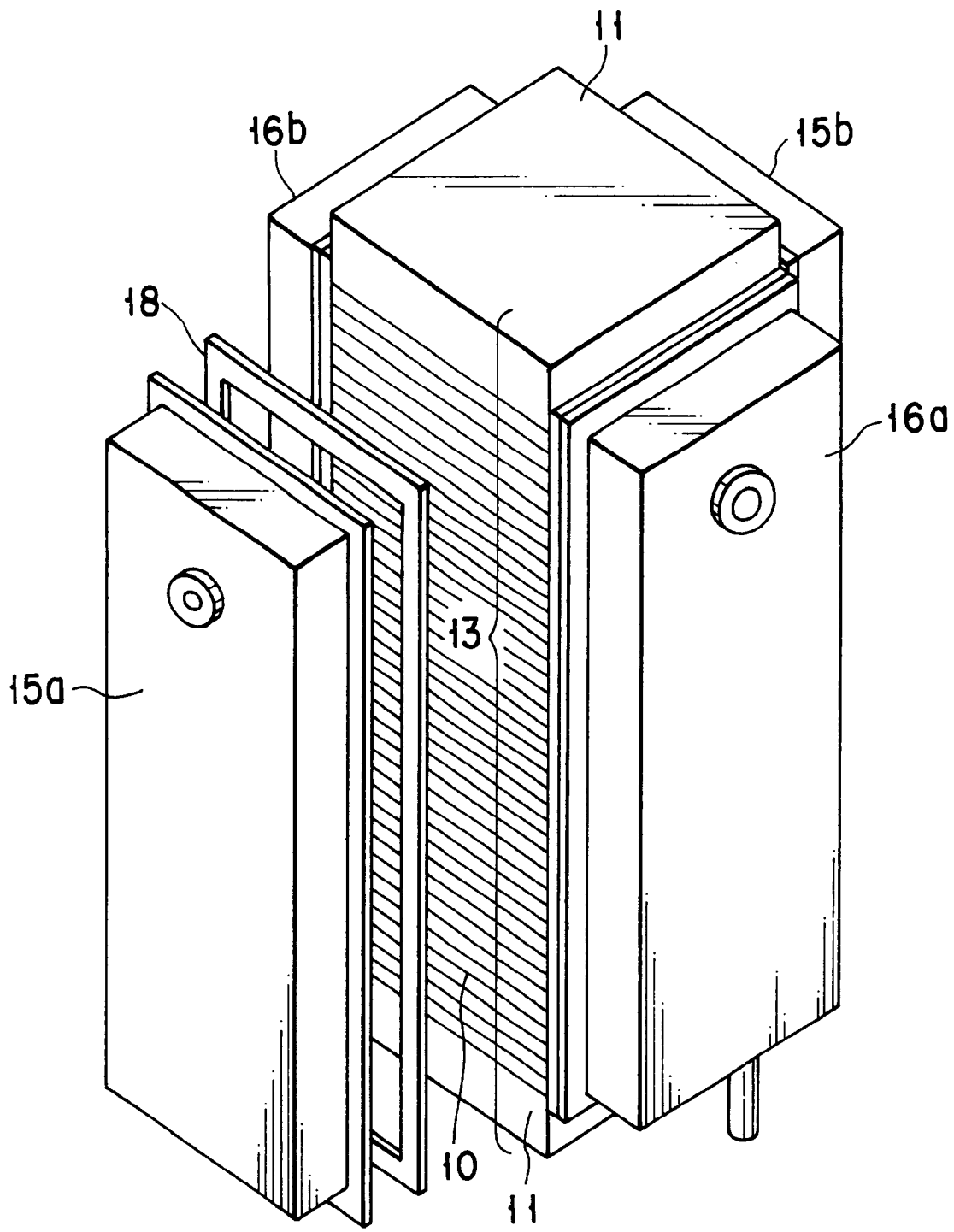
FIG. 2 is a perspective view showing an example of a state in which a gas manifold has been joined to the conventional cell stack.

An embodiment of the present invention will now be described with reference to the drawings. The same elements as those of the conventional structure shown in FIGS. 1 and 2 are given the same reference numerals and the same elements are omitted from description.

Figure 3:
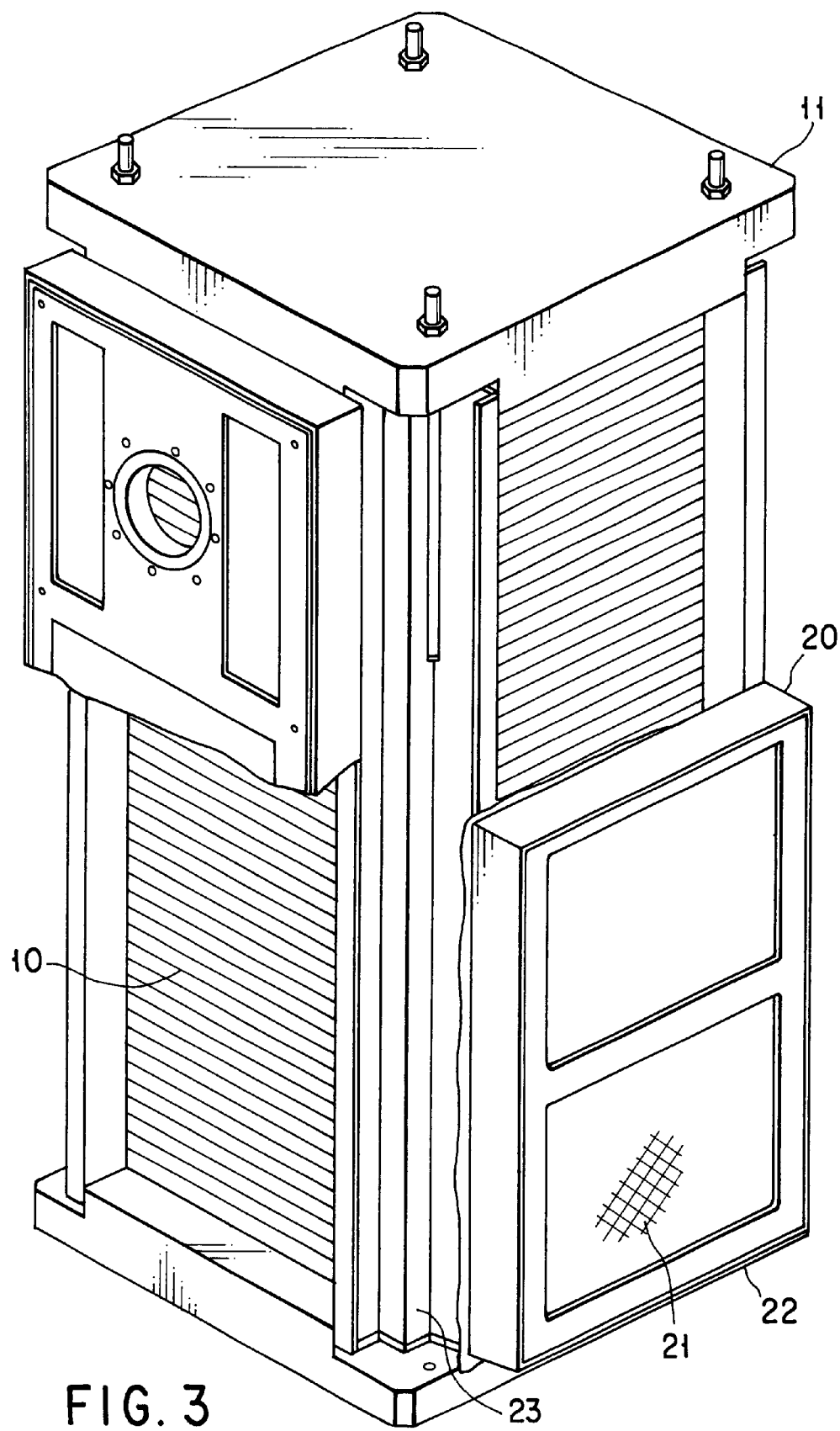
FIG. 3 is a perspective view showing the overall structure of a gas manifold according to the present invention.
Figure 4:
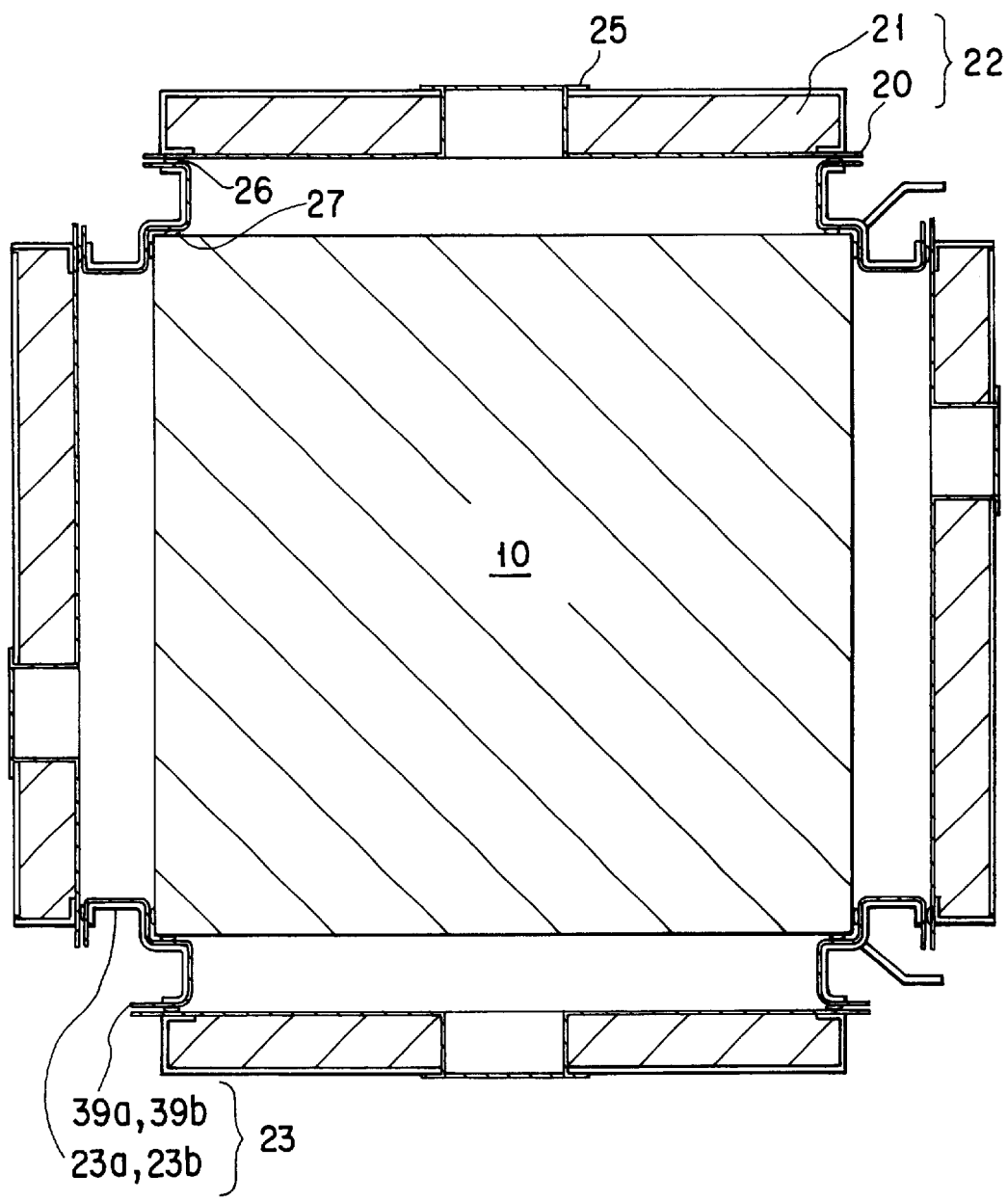
FIG. 4 is a cross sectional view showing a sealing structure of the gas manifold shown in FIG. 3.

The structure of this embodiment, and more particularly the overall structure of gas manifolds will now be described. As shown in FIGS. 3 and 4 which are a perspective view and a cross sectional view respectively, this embodiment has a structure that gas manifolds are formed by plate-like heat-insulating structures 22 disposed opposite to four side surfaces of a cell stack 10, and W-shape and rod-like corner members 23 disposed at corners of the cell stack 10.

The heat-insulating structure 22 is constituted by a plate-like heat insulating member 21 disposed on the outer surface of the heat-insulating structure 22 and a sheet member 20 joined to cover the inner surface (adjacent to the cell body) and side surfaces of the heat insulating member 21 and having heat and phosphoric acid resistance.

The heat-insulating structures 22, the heat insulating members 21, the sheet members 20 and the corner members 23 which constitute the gas manifolds will be described later.

Figure 5:
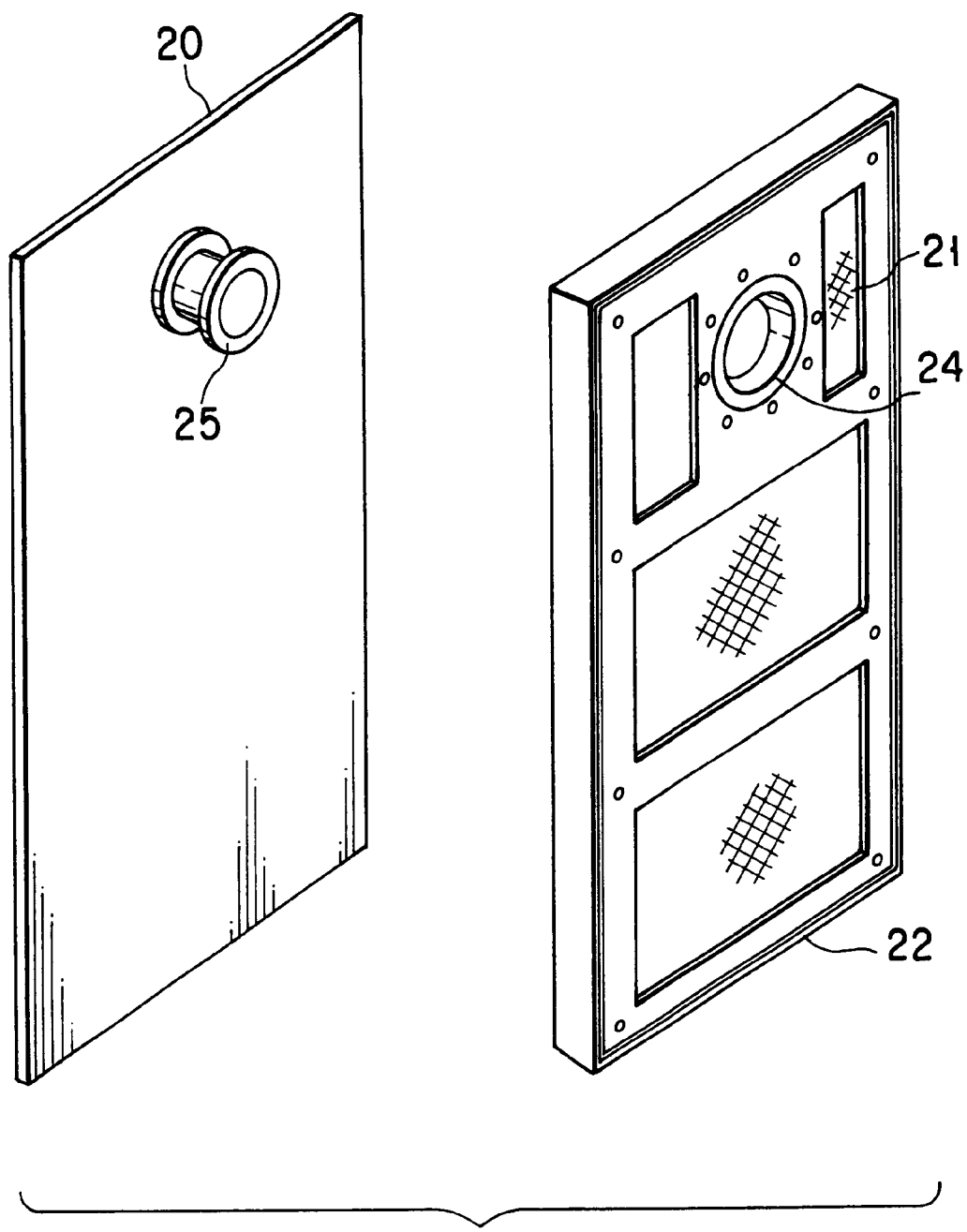
FIG. 5 is a perspective view showing a heat insulating material structure of the gas manifold according to the present invention.

The structure of a flange portion of the gas manifold will now be described. That is, the heat-insulating structure 22 for constituting the gas manifold is composed of the inside sheet member 20 opposing the cell stack and the plate-like heat insulating member 21 on the outside of the heat-insulating structure 22 (see FIGS. 3 and 4). As shown in FIG. 5, the heat insulating member 21 has a flange hole 24 through which gas passes.

A sleeve 25 made of the heat and phosphoric acid resisting sheet similar to that of the sheet member 20 is formed to project outwards at a position corresponding to the flange hole 24 formed in the sheet member 20. The sleeve 25 provided for the sheet member 20 penetrates the flange hole 24 formed in the external heat insulating member 21. Thus, the flange portion of the gas manifold is constituted. Therefore, the connection to an external pipe (not shown) is established through the flange portion. Note that the sleeve 25 is welded to the sheet member 20.

As described above, the internal sheet member 20 and the sleeve 25 are formed integrally with each other. Therefore, the structure can be simplified. Since the flange portion is constituted by the sleeve made of the heat and phosphoric acid resisting sheet, the phosphoric acid can reliably be intercepted. Thus, leakage of the phosphoric acid to the outside portion of the system can be prevented.

A gas sealing structure of the gas manifold will now be described. The gas manifold according to this embodiment realizes hermeticity in the gas manifold as follows as shown in FIG. 4, a first sealing member 26 having heat and phosphoric acid resistance is disposed between the heat-insulating structure 22, which constitutes the gas manifold, and the corner member 23 composed of corner channel portions 23a and 23b and liner sheets 39a and 39b. Moreover, a second sealing member 27 having heat and phosphoric acid resistance and insulating characteristic is disposed between the corner member 23 and the cell stack 10.

Since this embodiment has the above-mentioned structure that the first sealing member 26 is disposed between the heat-insulating structure 22 and the corner member 23, separation between the heat-insulating structure 22 and the corner member 23 is permitted. Therefore, assembling and inspection operations can easily be performed.

The sealing members having the heat and phosphoric acid resistance reliably prevent gas leak between the heat-insulating structure 22 and the corner member 23.

Since the second sealing member 27 is disposed between the corner member 23 and the cell stack 10, separation between the corner member 23 and the cell stack 10 is permitted. Therefore, the assembling and inspecting operations can easily be performed.

Moreover, leakage of fuel gas or oxidizer gas from the corner of the cell stack 10 can reliably be prevented. Since the second sealing member 27 has the insulating function in addition to the heat and phosphoric acid resistance, the gas manifold can electrically be insulated from the cell stack 10.

Figure 6A:
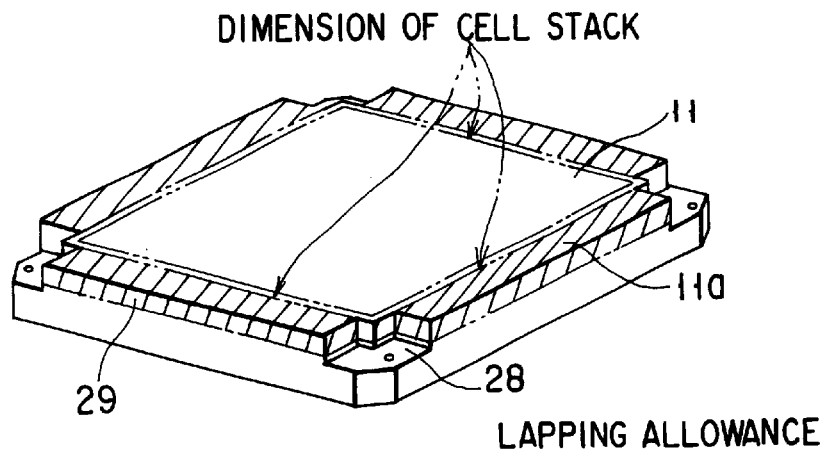
FIG. 6A is a perspective view showing clamping plates disposed in the upper and lower portions of the gas manifold according to the present invention.
Figure 6B:
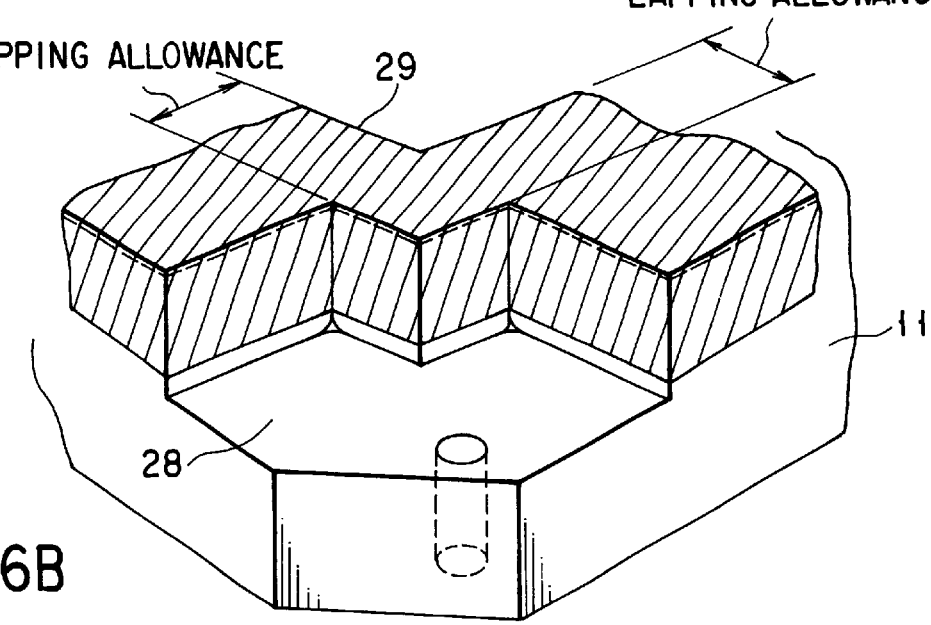
FIG. 6B is an enlarged view showing elements of the clamping plate.

A structure of a vertically clamping plate 11 of the gas manifold will now be described. FIG. 6A shows a phosphoric-acid processing portion 29 (a diagonally-shaded portion surrounded by a two-dot chain line) of a vertically clamping plate 11. The phosphoric-acid processing portion 29 is formed inwards from the outer end of the cell stack by tens of mm. FIG. 6B is an enlarged view of the cut portion 28. The vertically clamping plate 11 of the gas manifold according to this embodiment has cut portions 28 for receiving the corner members 23, the cut portions 28 being formed at corners thereof.

Figure 6C:
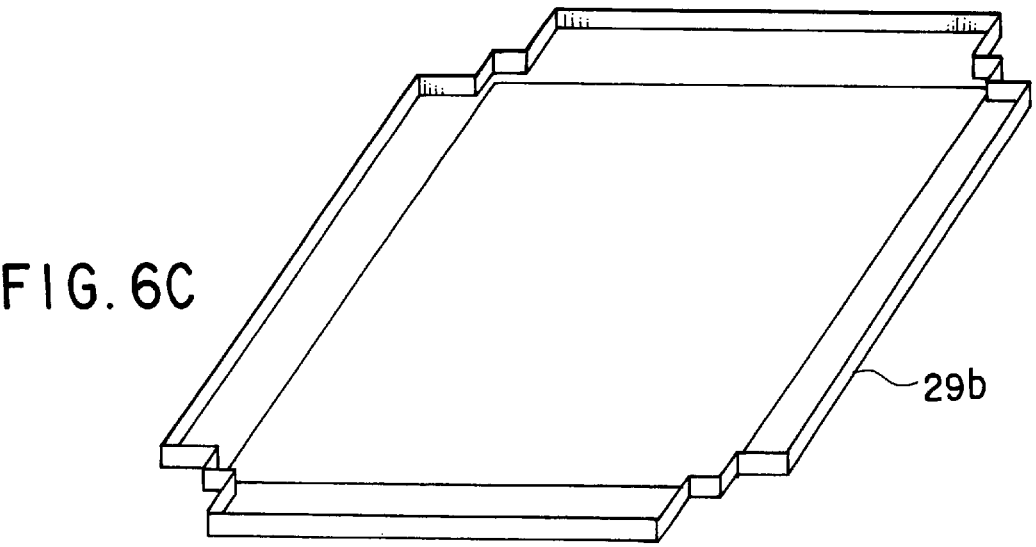
FIG. 6C is a perspective view showing a phosphoric acid shield for the gas manifold according to the present invention.

As shown in FIG. 6C, a phosphoric-acid preventive shield 29b for preventing erosion by dint of the phosphoric acid is joined to a portion of the vertically clamping plate 11 adjacent to the cell body. The phosphoric-acid preventive shield 29b is made of the same material as that of the heat and phosphoric acid resisting sheet which constitutes the sheet member 20.

As shown in FIG. 6A, the vertically clamping plate 11 has been subjected to the phosphoric acid resisting process in a portion projecting over the cell stack and a lapping portion which is inner than the surface of the cell stack. The phosphoric-acid resisting portion 29b is realized by any one of fluororesin coating, a lining of a fluororesin film and a lining of a fluorine rubber sheet.

The fluororesin coating is performed such that the portion of the vertically clamping plate 11 projecting over the cell stack and the lapping portion of the vertically clamping plate 11 are coated with the fluororesin by electrostatic coating. As an alternative to this, fluororesin dispersion is applied, and then fluororesin heated to temperatures higher than the melting point of the fluororesin is applied. The above-mentioned method is able to reliably coat a relatively complicated surface with the fluororesin. As described above, the portion projecting over the cell stack is coated with the fluororesin exhibiting excellent phosphoric acid resistance. Therefore, erosion of the cell stack by dint of the phosphoric acid and phosphoric acid steam can be prevented.

The lining in the form of the fluororesin film is applied to fit the outer shape of the portion of the vertically clamping plate 11 projecting over the cell stack. The fitting process is performed such that the film is bent to fit the foregoing shape or cut films are heated and welded to each other.

Thus, the fluororesin film exhibiting excellent phosphoric acid resistance is used as the lining. Therefore, erosion of the cell stack by dint of the phosphoric acid and phosphoric acid steam can be prevented.

Since the lining is in the form of the film, any pinhole can be prevented which occurs when coating is employed. Moreover, satisfactory phosphoric acid resistance can be realized.

Similarly to the lining of the fluorine film, the lining of the fluorine rubber sheet is applied to fit the shape of the portion of the vertically clamping plate 11 projecting over the cell stack. The fitting process is performed by bonding cut sheets to each other with an adhesive material. Since the lining made of the fluorine rubber sheet exhibiting excellent phosphoric acid resistance is applied, erosion of the cell stack by dint of the phosphoric acid and phosphoric acid steam can be prevented.

Figure 7:
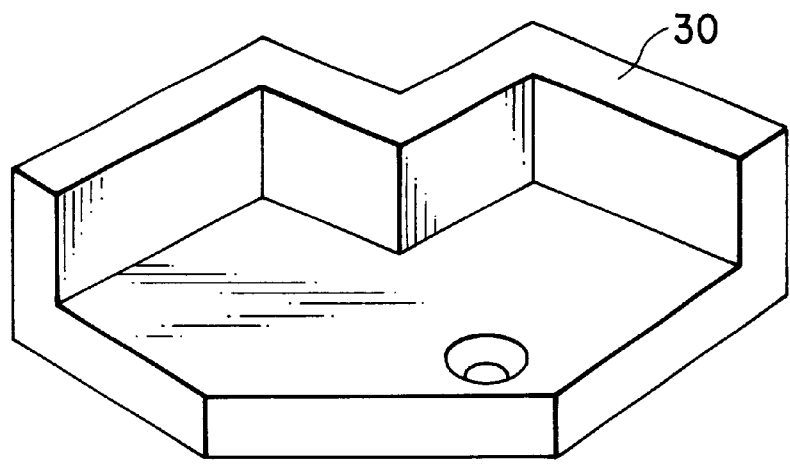
FIG. 7 is a perspective view showing a sealing member which is disposed in a cut portion of the clamping plate shown in FIGS. 6A and 6B.

The cut portion 28 for receiving the corner member is provided with a cushion member 30 formed as shown in FIG. 7. The cushion member 30 is formed into the same shape as that of the cut portion 28 and made of a heat-resisting elastomer, such as fluorine rubber.

Figure 8:
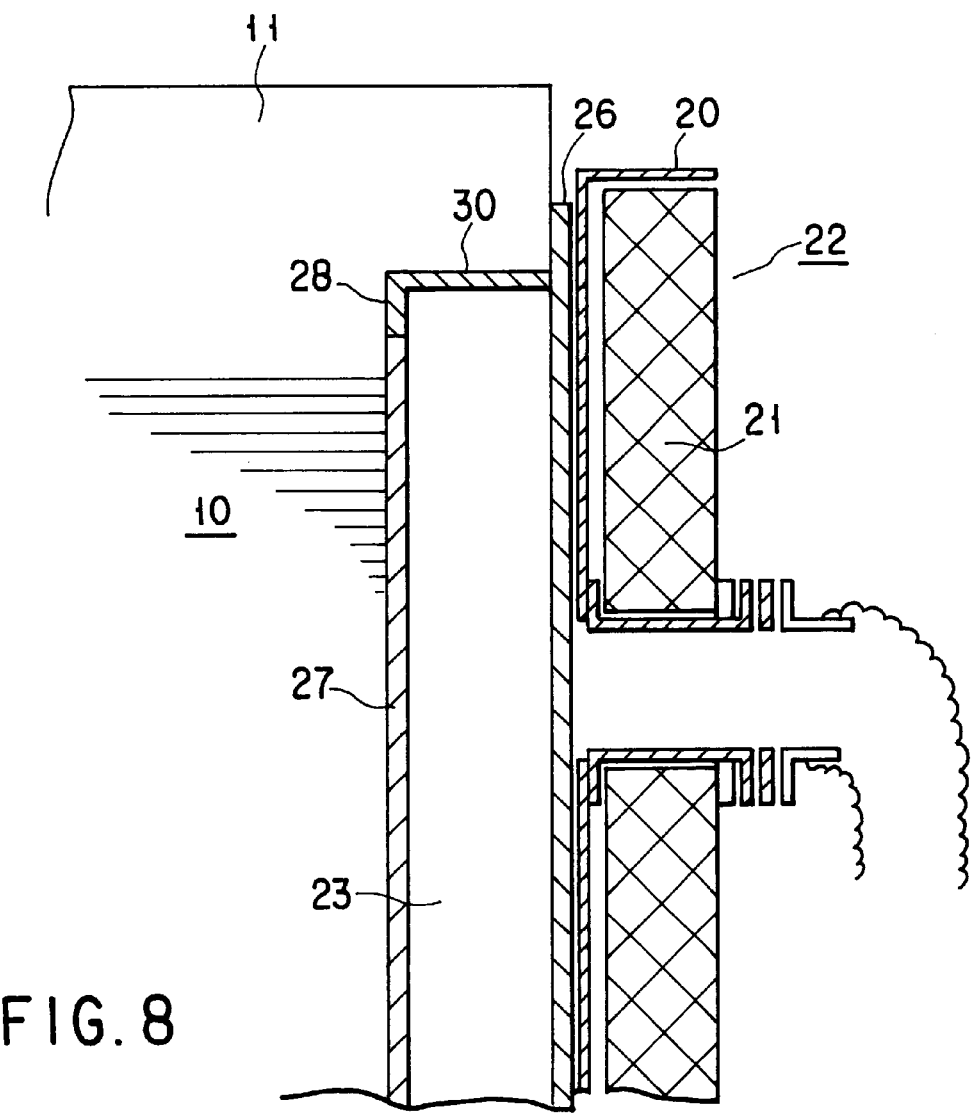
FIG. 8 is a cross sectional view showing an assembled state of the gas manifold according to the present invention.

As shown in FIG. 8, the vertically clamping plate 11 has an area which is larger than that of the cell. The corner member 23 is, through the cushion member 30, disposed in the cut portion 28 formed in each corner portion. As described above, the boundary between the corner member 23 and the cell stack 10 is sealed by the second sealing member 27.

Moreover, the outer surface of each corner member 23 is flush with the outer surface of the vertically clamping plate 11. The boundary between the heat-insulating structure 22 and the corner member 23 and that between the heat-insulating structure 22 and the vertically clamping plate 11 are sealed by the first sealing member 26.

As described above, the embodiment has the structure that the cushion member 30 disposed in the cut portion 28 in each corner portion of the vertically clamping plate 11 is made of the heat-resisting elastomer. Therefore, the boundary between the cut portion 28 and the corner member 23 can be sealed. In addition, the difference in the thermal expansion caused from the difference between the material of the cell stack 10 and that of the corner member 23 can be absorbed.

As described above, the gas manifold according to this embodiment is composed of the heat-insulating structure 22 and the corner member 23. When the gas manifold is assembled, the corner members 23 are stood erect in the cut portions 28 of the vertically clamping plate 11 and the heat-insulating structures 22 are joined to the outer portions.

The structure for claming the gas manifold will now be described. The gas manifold according to this embodiment is clamped in such a manner that spaces are formed among the heat-insulating structures, the corner members and the cell stack.

Figure 9:
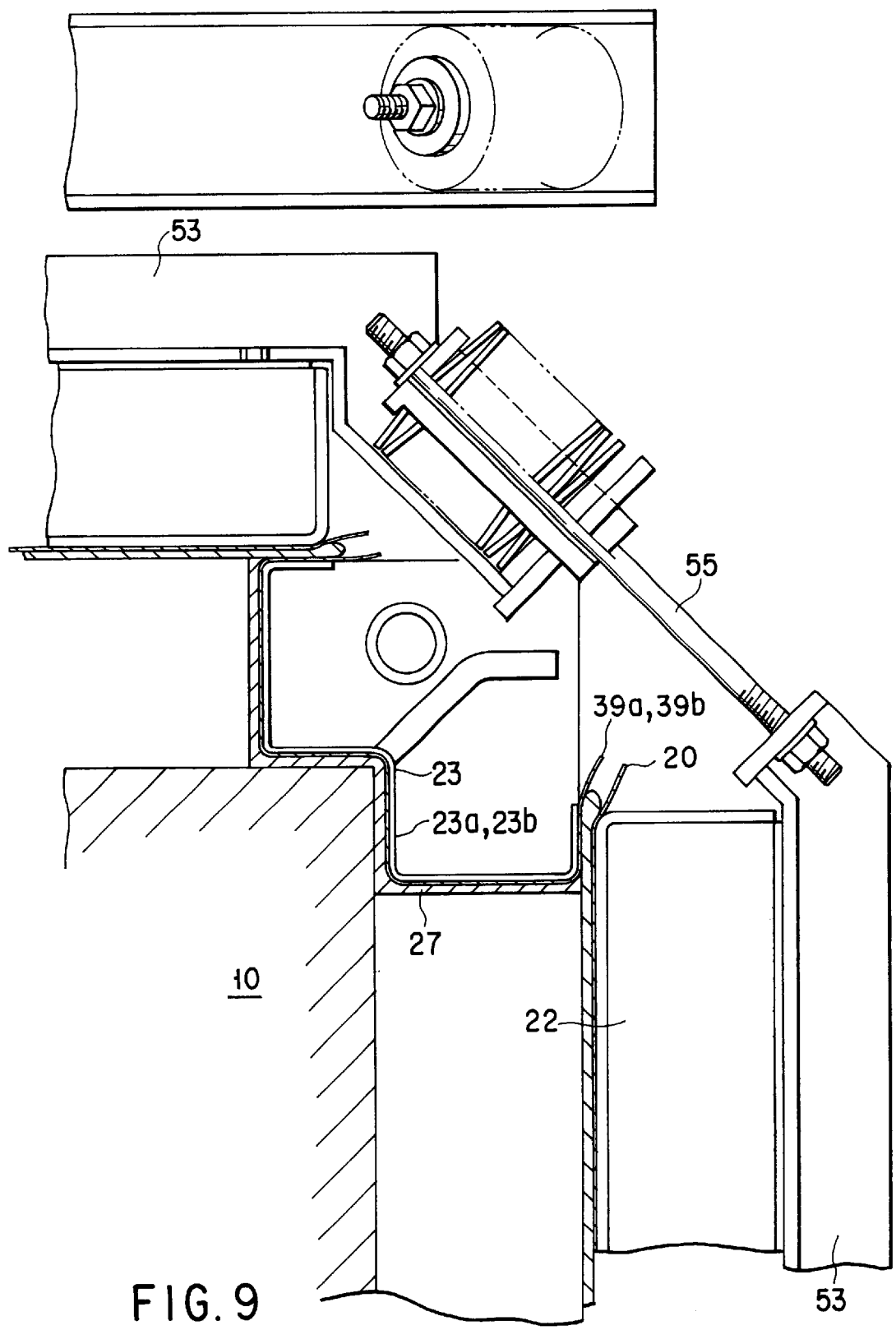
FIG. 9 is a horizontal cross sectional view showing a clamping structure using a disc spring.

A clamping structure shown in FIG. 9 is constituted by connecting four heat-insulating structures corresponding to the side surfaces of the cell stack to one another with bolts. Moreover, disc springs are used to clamp the structure.

As shown in FIG. 9, the cell stack 10, the corner members 23 and the heat-insulating structures 22 are disposed. The heat-insulating structure 22 is provided with an angled structure 53 formed to hold the heat-insulating structure from a rear portion.

A disc spring 54 is disposed at an end of the angled structure 53, while a through hole for screwing a clamping stud 55 for clamping the disc spring is formed at another end of another angled structure 53. The four heat-insulating structures are connected to one another by the clamping studs 55. Then, the disc springs 54 are clamped. Thus, the heat-insulating structures, the corner members and the cell stack can easily and uniformly be clamped while spaces are being formed among the foregoing elements.

A plurality of the foregoing clamping mechanisms are formed in a direction of the height of the cell stack at the same intervals.

Figure 10:
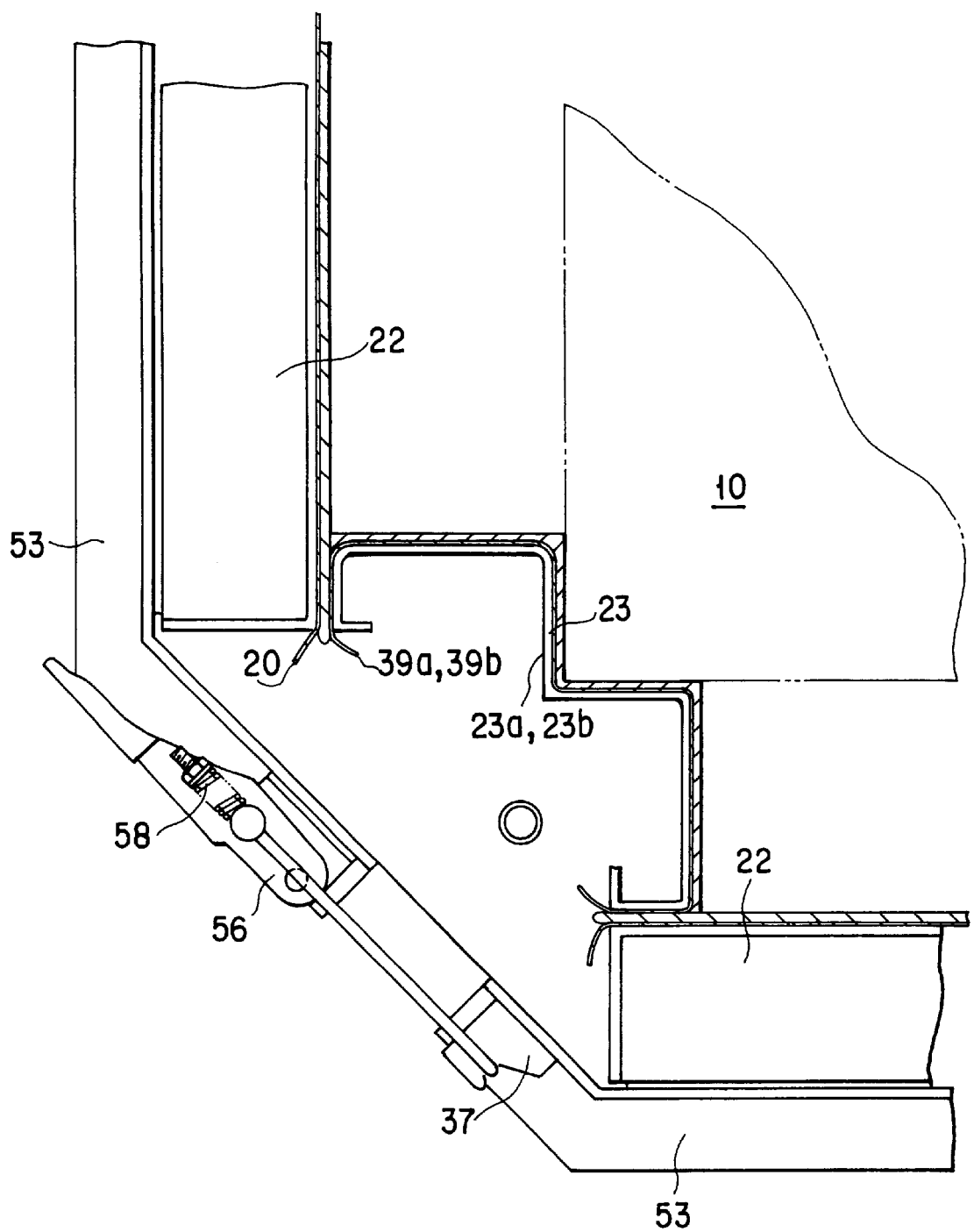
FIG. 10 is a horizontal cross sectional view showing a clamping structure using a toggle clamp having a U-arm.

A clamping structure shown in FIG. 10 is constituted such that the four heat-insulating structures corresponding to the side surfaces of the cell stack are clamped by U-arm toggle clamps.

The cell stack 10, the corner members 23 and the heat-insulating structures 22 are disposed. The heat-insulating structure 22 is provided with an angled structure 53 for holding the heat-insulating structure from a rear position.

A U-arm toggle clamp 56 is disposed at an end of the angled structure 53, while a hook 57 for hooking a U-arm of the U-arm toggle clamp is disposed at another end of another angled structure 53. The four heat-insulating structures 22 are connected to one another by the U-arms of the U-arm toggle clamps. When the clamp of the U-arm toggle clamp is inclined to the tractive portion, the heat-insulating structures, the corner members and the cell stack can easily and quickly be clamped while spaces are being formed among the foregoing elements.

To prevent looseness of the sealing members by dint of creeping, constant clamping force must be maintained by providing a spring 58 for the U-arm toggle clamp 56.

A plurality of the clamping mechanisms are provided in a direction of the height of the cell stack at the same intervals.

Figure 11:
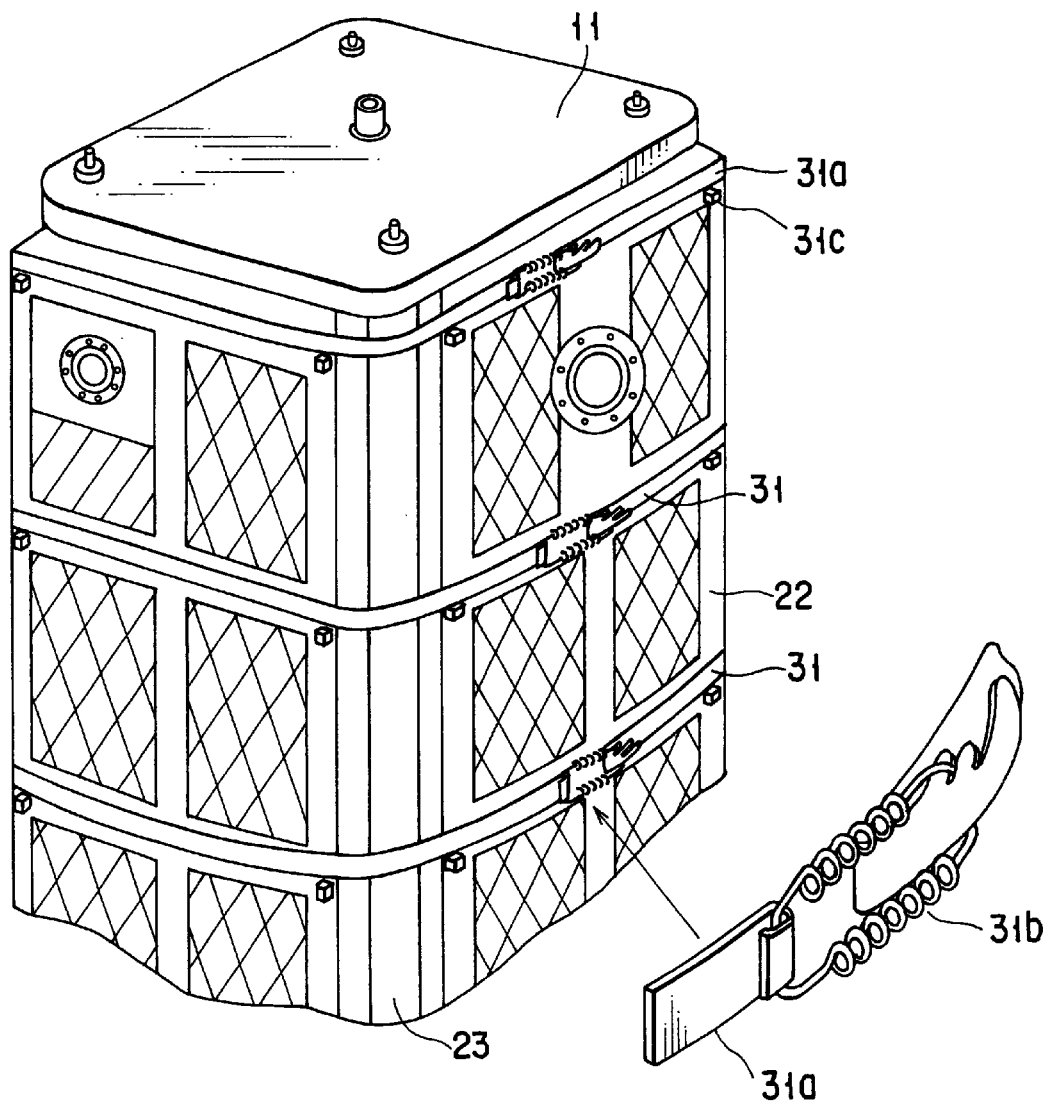
FIG. 11 is a perspective view showing a clamping structure using a spring buckle.

A clamping structure shown in FIG. 11 is constituted such that the corner member 23 and the heat-insulating structure 22 are disposed on each of the four side surfaces of the cell stack. Moreover, a stainless-steel thin-plate band 31a and a spring buckle 31b clamp the foregoing elements.

The heat-insulating structure 22 is provided with a stopper 31c which is a holding member for holding the spring buckle 31b. Thus, undesirable shift of the spring buckle 31b can be prevented. Moreover, the overall body of the gas manifold can uniformly be clamped.

As described above, this embodiment is able to uniformly and quickly clamp the overall body of the gas manifold with a simple structure.

Figure 12:
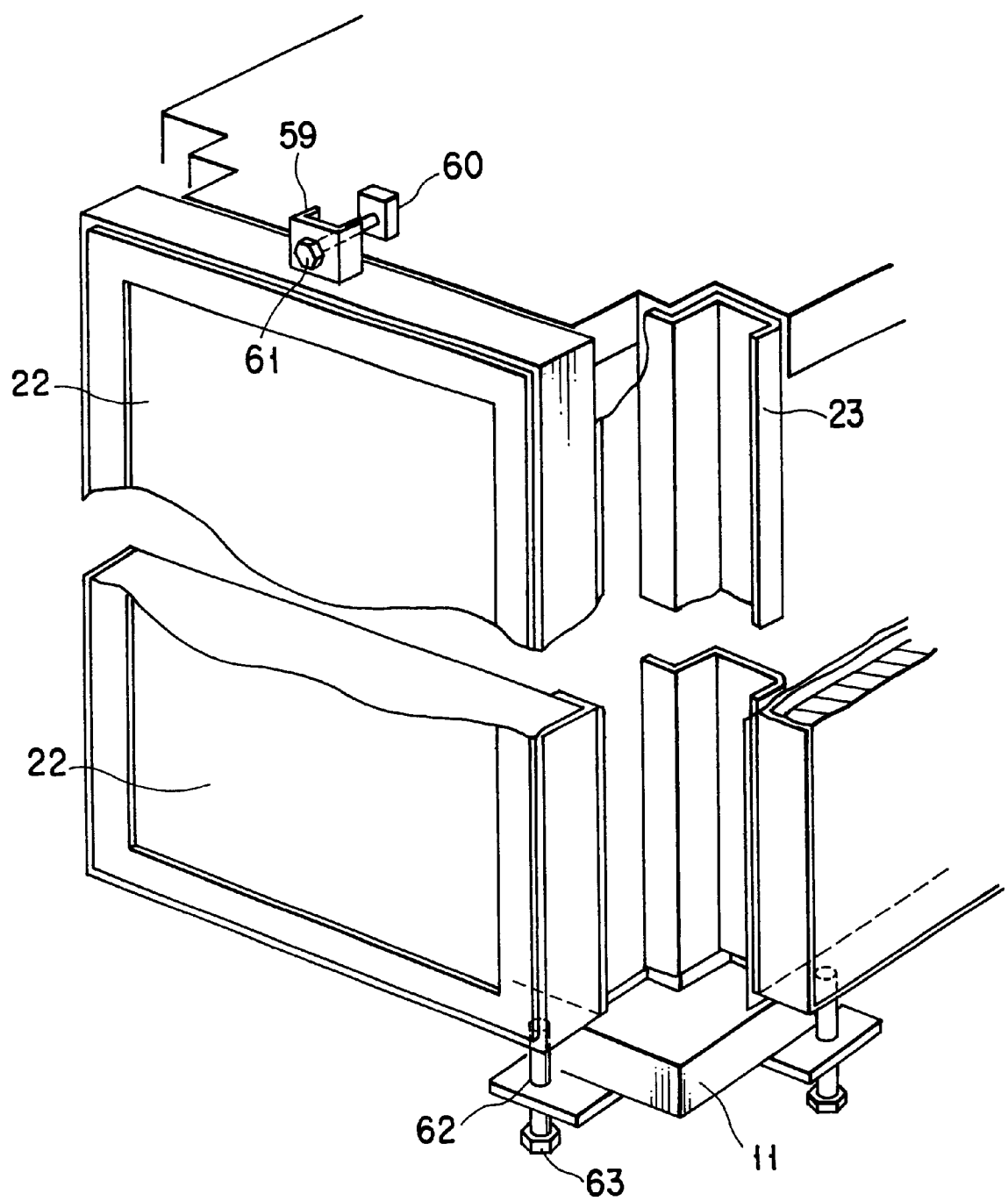
FIG. 12 is a perspective view showing a structure for locating a center-claming structure and a heat-insulating structure provided for a lower clamping plate.

A clamping structure shown in FIG. 12 is added to the clamping structure using the clamping members such that a center clamping structure is provided for each of the centers of the upper and lower surfaces of the heat-insulating structures and the vertically clamping plates facing the foregoing centers.

A fixing channel 59 is joined to the center of each of the upper and lower surfaces of the heat-insulating structure 22. A clamping seat 60 is joined to each of the upper and upper and lower centers of the vertically clamping plate 11. The fixing channels 59 and the clamping seats 60 are clamped by insulation bolts 61 through insulation washers (not shown).

As described above, according to this embodiment, a simple structure is required to uniformly clamp the overall body of the heat-insulating structures, the corner members and the cell stack while spaces are being formed among the above-mentioned elements. Moreover, the center clamping structure can be used as a temporal fixing means. Thus, the workability can be improved.

Moreover, a support 62 for locating the heat-insulating structure 22 and a jack bolt 63 which is capable of vertically moving the heat-insulating structure 22 are provided for each of the four corners of the vertically clamping plates 11.

As described above, according to this embodiment, the heat-insulating structure 22 can easily vertically be located. Thus, undesirable shifts among the heat-insulating structures, the sealing members and the vertically clamping plates can be prevented. Thus, the sealing reliability can be improved.

The heat-insulating structure will now be described. As described above, the heat-insulating structure 22 for constituting the gas manifold is composed of the plate-like heat insulating member 21 and the sheet member 20.

The heat insulating member 21 and the sheet member 20 will now be described.

Figure 13:
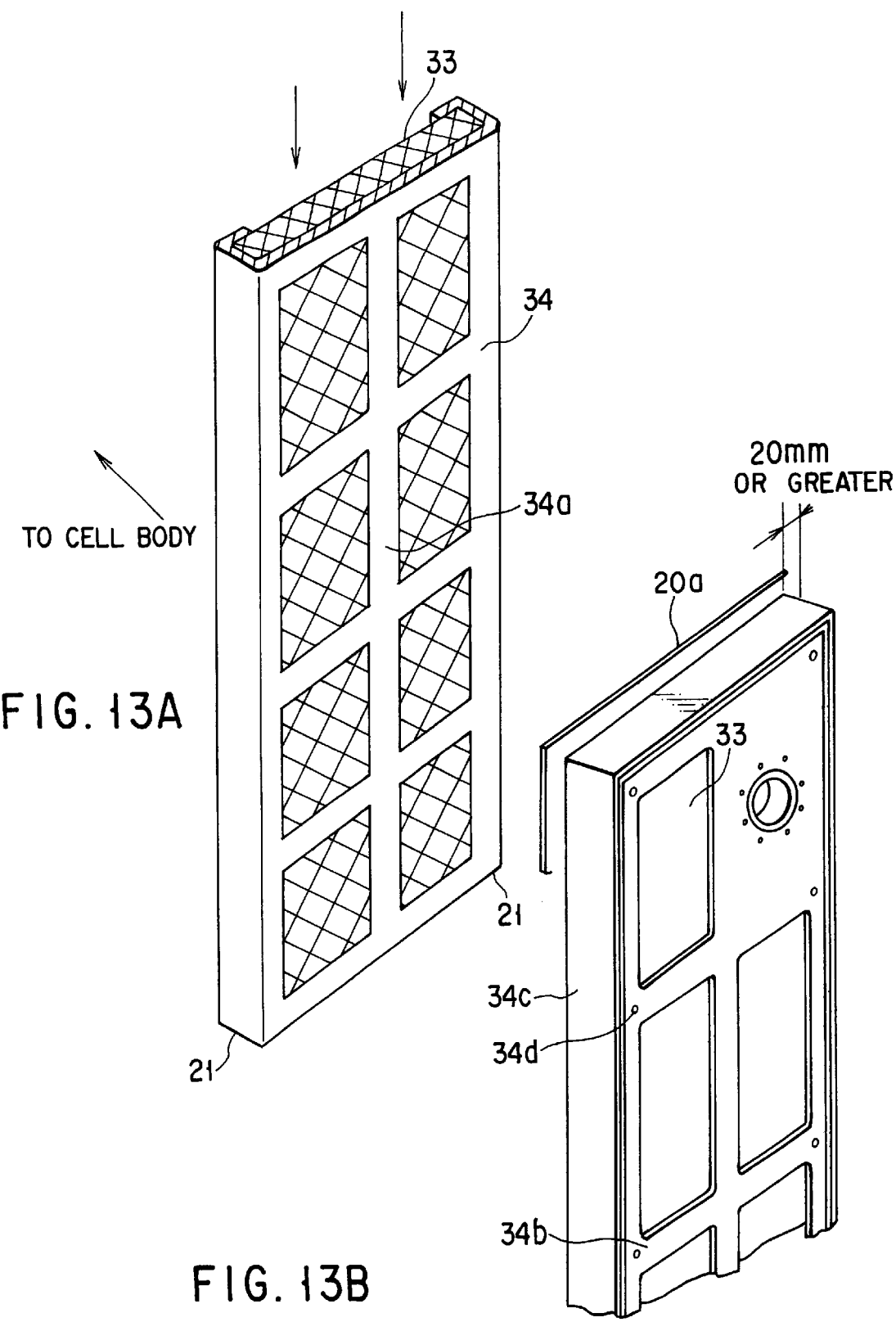
FIG. 13A is a perspective view showing a structure of a heat insulating member in which a heat insulating material is inserted into a heat-insulating-material holding frame.
FIG. 13B is a perspective view showing the structure of a heat insulating member in which a heat insulating material is inserted by removing punched plates.

The plate-like heat insulating member 21, which constitutes the gas manifold according to this embodiment, is formed by inserting a heat insulating material 33 into a heat-insulating-material holding frame 34 formed into a frame shape, as shown in FIG. 13A. To enable the heat-insulating-material holding frame 34 to withstand the internal pressure of fuel gas or oxidizer gas, an elongated plate 34a is provided for the outer surface of the heat-insulating-material holding frame 34.

The elongated plate 34a is not provided for the portion of the heat-insulating-material holding frame 34 adjacent to the cell body. That is, the foregoing portion is not reinforced. The heat insulating material 33 can be inserted into the heat-insulating-material holding frame 34 by removing one side (the upper side in FIG. 13A).

As shown in FIG. 13B, a punched plate 34b is joined to the heat-insulating-material holding frame 34c on the outer surface of the heat insulating member 21 with bolts 34d. The side of the heat-insulating-material holding frame 34c adjacent to the cell body is formed into a frame shape. Thus, the heat insulating material 33 can be inserted into the frame by removing the punched plate 34b.

As described above, the heat insulating member 21 according to this embodiment facilitates insertion and retention of the heat insulating material. Moreover, the overall strength of the heat insulating members 21 can be increased and the shapes can be uniformed. Therefore, the heat insulating members 21 can uniformly be joined to the side surfaces of the cell stack. Moreover, the heat insulating members 21 can uniformly be clamped.

It is preferable that the heat insulating material 33 for use in the heat insulating member 21 according to this embodiment is plastic, ceramics, rubber or wood except for metal and having a thermal conductivity of 0.08 (W/m·K) or lower at 25° C. That is, it is preferable that a material is employed which has a small thermal conductivity and an excellent heat insulating characteristic, which is free from deterioration even after use for a long time and which is able to withstand somewhat strong phosphoric acid.

If the thermal conductivity at 25° C. is 0.08 (W/m·K) or higher, the thickness of the heat insulating material cannot be reduced. Therefore, the size of the gas manifold cannot be reduced as compared with that of the conventional gas manifold.

Since the heat insulating material having the thermal conductivity of 0.08 (W/m·K) or lower at 25° C. is employed, heat can reliably be insulated. Thus, energy loss occurring by dint of heat radiation can be prevented. As a result, the power generating efficiency of the cell including use of exhaust heat can be improved.

It is preferable that the heat insulating material 33 is in the form of an aggregation of fibers, foams or powder having a density of 0.2 g/cm$^3$ or lower.

The reason for this will now be described. If the density of the heat insulating material 33 is 0.2 g/cm$^3$ or higher, the weight of the heat insulating member 21 is increased. Therefore, the gas manifold cannot manually be assembled and thus machines, such as a crane, must be used. Therefore, the workability deteriorates. Since manual joining and removal are important factors for on-site adjustment and repair, it is preferable that the density of the heat insulating material 33 is 0.2 g/cm$^3$ or lower.

As for the strength of the heat insulating material 33, it is preferable that the compressibility is 10% or lower when the compressive load is 200 kg/m$^2$. If the compressibility is 10% or higher when the compressive load is 200 kg/m$^2$, the heat insulating material is excessively deformed and destroyed when the gas is actually passed. What is worse, the gas cannot appropriately be distributed to the cells. Moreover, the heat insulating material is compressed, causing the thermal conductivity to be raised excessively to obtain a required heat insulation effect. As a result, the energy loss occurring when heat is radiated is enlarged. Thus, the power generating efficiency of the cell including the use of exhaust heat is lowered.

The heat insulating material 33 for use in the heat insulating member 21 constituting the gas manifold according to this embodiment is formed by one or a plurality of heat insulating layers which are made of one or more types of materials and which have different strengths.

Figure 14:
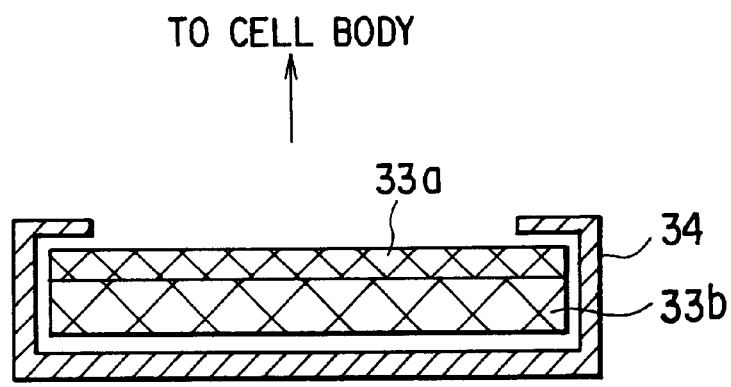
FIG. 14 is a cross sectional view showing the heat insulating member shown in FIGS. 13A and 13B.

That is, as shown in FIG. 14, the heat insulating material 33, which is inserted into the heat-insulating-material holding frame 34, is composed to two types of heat insulating materials. The heat insulating materials 33 may be layered. For example, a structure may be employed in which a first heat-insulating-material 33a which is disposed adjacent to the cell body, that is, on the inside, is a heat insulating material having excellent heat resistance and thus capable of withstanding temperatures of about 200° C. Moreover, a second heat-insulating-material 33b, which is disposed on the outside, is a heat insulating material having satisfactory mechanical strength.

If only the first heat-insulating-material 33a having excellent heat resistance and usually made of inorganic fibrous substance is employed, satisfactory mechanical strength cannot be obtained in spite of satisfactory heat resistance being obtained. Therefore, unsatisfactory mechanical strength results in great deformation to occur when the internal pressure has been raised because of passing of the gas. To prevent the deformation, the heat insulating material must have a large thickness which cannot practically be realized.

If only the second heat-insulating-material 33b having satisfactory mechanical strength is employed, realized heat resistance is in general unsatisfactory. Thus, the inner surface deteriorates by dint of heat of the hot gas, causing the reliability in the long term to deteriorate.

As a matter of course, it is more preferable, that the first heat-insulating-material 33a having excellent heat resistance and the second heat-insulating-material 33b having satisfactory mechanical strength are materials each having a low thermal conductivity.

Thus, it is possible to obtain a heat-insulting-material having a low thermal conductivity and satisfactory mechanical strength by using a combination of the heat-insulting-material 33a having excellent heat resistance and the heat-insulting-material 33b having excellent strength properly.

It is preferable that aluminum foil having a thickness of tens of microns is interposed among the plural heat insulating material layers made of different materials and having various strengths. Thus, the heat insulation effect can furthermore be improved.

It is preferable that the first heat insulating material which is disposed adjacent to the cell body and disposed on the inside and which has excellent heat resistance is a heat insulating material made of fibrous substances, such as rock wool or glass wool, having satisfactory heat resistance. Since the foregoing material has excellent heat resistance and a low density, an advantage can be obtained in that the weight can be reduced.

It is preferable that the second heat insulating material which is disposed on the outside and which has satisfactory mechanical strength is a heat insulating material having a cellular structure, such as phenol foam, which exhibits excellent mechanical strength.

Thus, satisfactory mechanical strength can be realized and an excellent heat insulating effect can be obtained. Since the foregoing material has a low density, weight reduction is permitted.

It is preferable that the thickness of the heat insulating material 33 is 100 mm or smaller. If the thickness is 100 mm or larger, a large space is required in spite of excellent heat insulating performance being obtained. Therefore, the overall size of the cell package cannot be reduced and thus an area required to install the package is enlarged excessively. Moreover, both of the cost and weight are enlarged in proportion to the thickness of the heat insulating material.

Figure 15A:
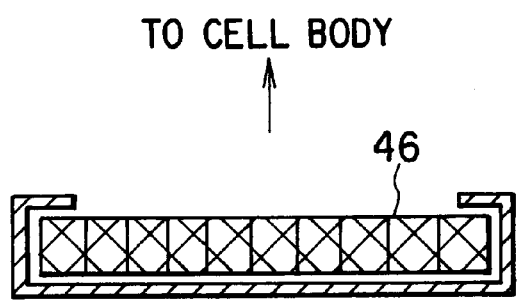
Figure 15B:
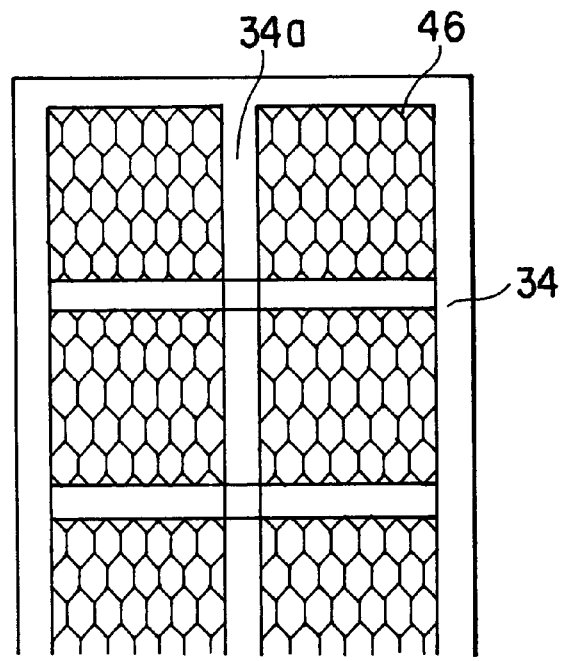

As shown in FIGS. 15A and 15B, the heat insulating material may be in the form of a honeycomb structure 46 which is filled with a fibrous, foam or powder heat insulating material.

When the heat insulating material is formed into the honeycomb structure, the mechanical strength of the heat insulating material can reliably be increased. Therefore, the area of the elongated plate 34a of the heat-insulatingmaterial holding frame 34 can be reduced or the elongated plate may be omitted. As a result, the weight of the heat insulating member 21 can be reduced.

Figure 16A:
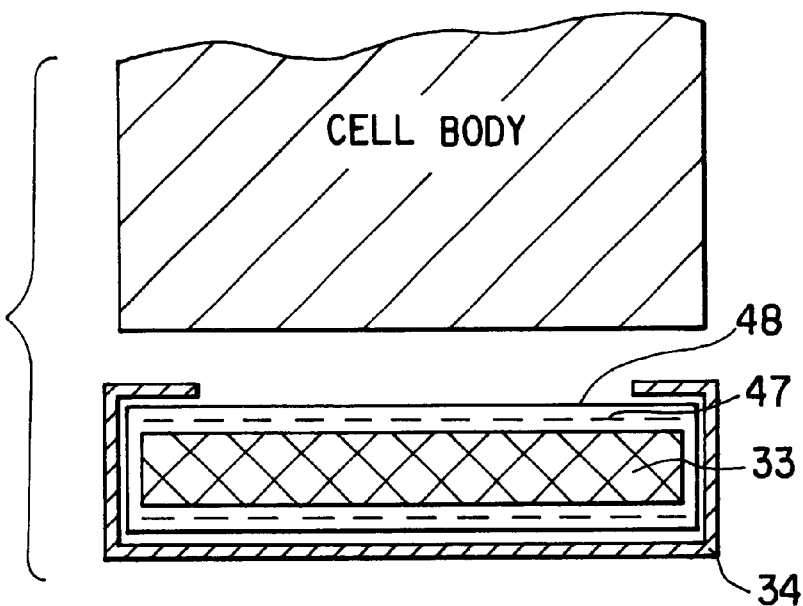
Figure 16B:
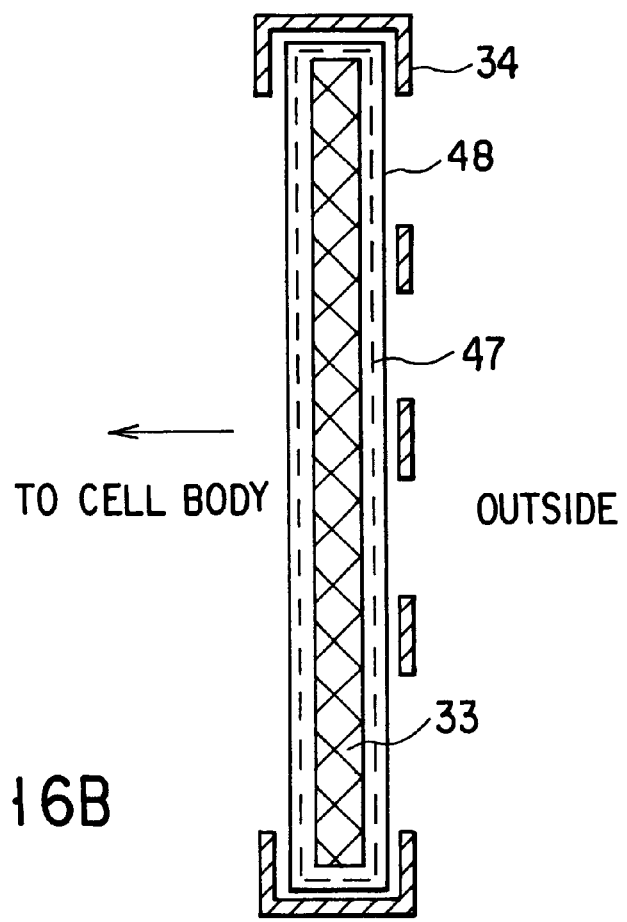

As shown in FIGS. 16A and 16B, one or two sides of the heat insulating material 33 may be reinforced with reinforcing materials 47, such as a plain lath, a hexagonal wire mesh or punching metal. Moreover, the upper surface of the reinforcing material 47 is covered with a glass cloth 48.

When the heat insulating material is reinforced by the reinforcing material 47, such as the plain lath, the hexagonal wire mesh or the punching metal, the strength of the heat insulating material can be increased. Since the upper surface of the reinforcing material 47 is covered with the glass cloth 48, handling can be facilitated. Therefore, insertion into the heat-insulating-material holding frame 34 can smoothly be performed. Since an air layer is formed between the heat insulating material 33 and the glass cloth 48, the heat insulation effect can furthermore be improved. Since deformation can be prevented when the gas is allowed to flow, the gas can uniformly be distributed.

The sheet member 20 which is a component of the heat-insulating structure 22 which constitutes the gas manifold according to this embodiment will now be described.

Figure 17A:
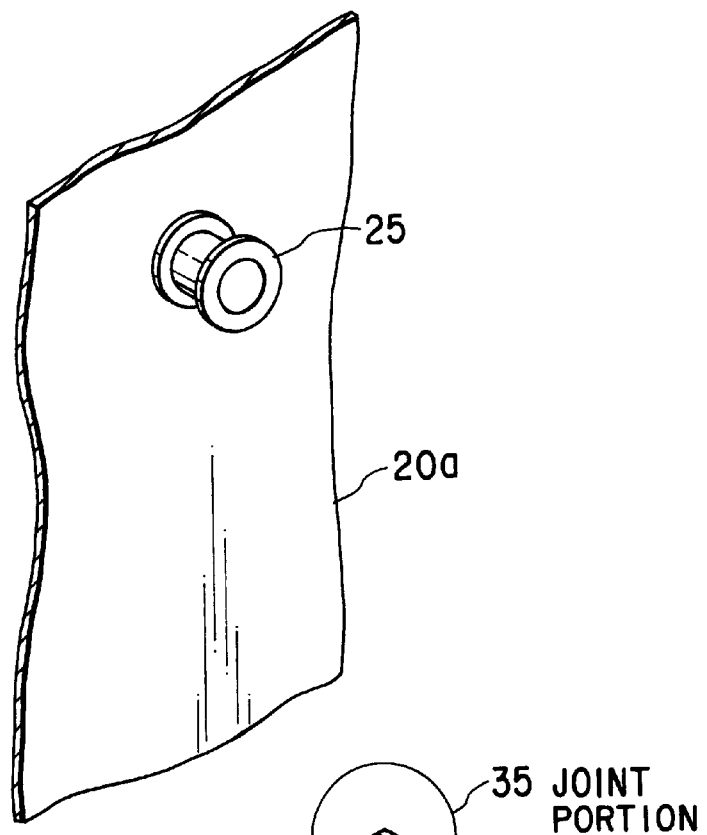
FIG. 17A is a perspective view showing a state in which a thin plate-like sheet member has been joined.

A sheet member 20a which constitutes the gas manifold according to this embodiment is formed into a thin plate-like shape having a size which is larger than that of the heat-insulating-material holding frame, as shown in FIG. 17A. A portion of the sleeve 25 for a flange is joined to the thin plate-like sheet member. A double coated tape (not shown) is applied to a portion or the overall surface of the heat-insulating-material holding frame 34. Moreover, the sheet member 20a is bonded to the upper surface of the double coated tape. The heat-insulating-material holding frame 34, to which the sheet member 20 has been applied, is disposed at a position opposing the side surface of the cell stack (also shown in FIG. 13B).

It is preferable that the size of the sheet member 20a is larger than that of the heat-insulating-material holding frame by 20 mm or greater. If the size is larger that of the heat-insulating-material holding frame by 20 mm or greater, the insulating characteristic from the cell stack can be realized.

As described above, according to this embodiment, even a simple structure enables insulating characteristic to be obtained. Thus, the workability can significantly be improved.

Figure 17B:
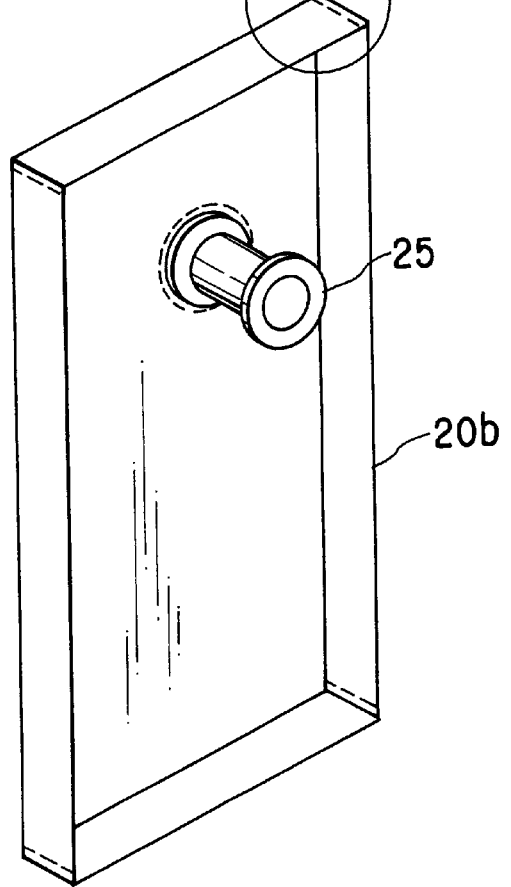
FIG. 17B is a perspective view showing a sheet member molded into a box-like shape to fit to the shape of the heat-insulating-material holding frame.

A sheet member 20b constituting another example of the gas manifold according to this embodiment is manufactured by a molding process to have a box-like shape to be adaptable to the heat-insulating-material holding frame 34, as shown in FIG. 17B. Among a variety of molding methods, a simplest method is to join each of the four corners and the portion of the sleeve 25 for the flange so as to form a predetermined shape.

Joining portions 35 of the sheet member 20b are formed by joining heat and phosphoric acid resisting sheets to each other at joint portions. Then, an impulse heater is operated to heat and weld the foregoing sheets.

Also the sleeve 25 for the flange may be joined by a circular or a semicircular impulse heater.

A blow molding method may be employed. The blow molding method is performed such that a mold having the shape of the heat-insulating-material holding frame is prepared, and then a heat and phosphoric acid resisting sheet is placed on the mold. Then, the sheet is heated to a temperature near the melting temperature for the sheet, and then air is blown through the upper surface of the sheet. Thus, the sheet is formed into the shape of the heat-insulating-material holding frame. The above-mentioned method has a problem in that a large furnace is required to heat the sheet and the thickness of the sheet in the corner portion cannot be reduced.

The sheet member 20b molded into the box-like shape is fitted to the heat insulating member 21 from a position adjacent to the cell body so as to integrate the two elements. Thus, the heat-insulating structure 22 can be formed (see FIG. 5).

As described above, according to this embodiment, the heat and phosphoric acid resisting sheet can previously be molded into the box-like shape to be adaptable to the shape of the heat-insulating-material holding frame 34. Therefore, time required to manufacture the fuel cell can be shorted. Moreover, the assembling work can easily be performed. Since the portion of the heat insulating member 21 adjacent to the cell body can completely be covered with the sheet member 20b, leakage of the phosphoric acid to the outside can be prevented.

The sheet member 20 according to this embodiment must have permeability of phosphoric acid to reduce the thickness of the sheet member 20 and enable an economical advantage to be obtained. Therefore, the inventors of the present invention attempted to select phosphoric-acid resisting resin sheet suitable to constitute the sheet member 20 by investigating a PFA (tetrafluoroethylene and perfuloroalkoxyethylene copolymer) resin sheet, a PTFE (tetrafluoroethylene) resin sheet and a FEP (tetrafluoroethylene and propylene hexafluoride copolymer) resin sheet.

Figure 18:
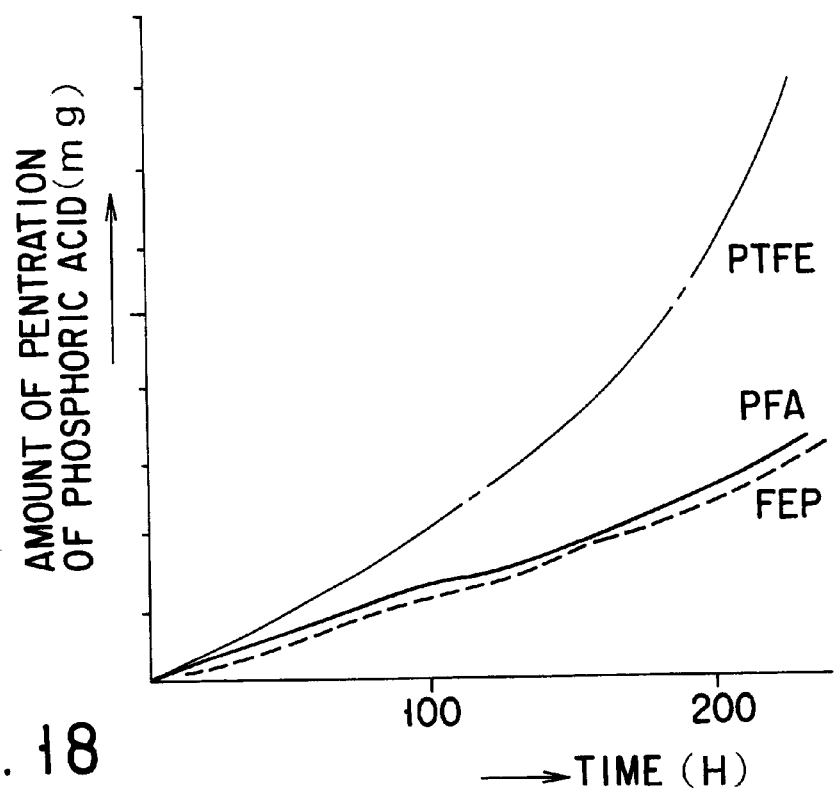
FIG. 18 is a graph showing amounts of penetration of phosphoric acid through variety of resin sheets.

Results are shown in FIG. 18. It is preferable that the PFA resin sheet or the FEP resin sheet which is not considerably penetrated by the phosphoric acid is employed as the heat and phosphoric acid resisting sheet for constituting the sheet member 20.

As shown in FIG. 18, the PFA resin sheet and the FEP resin sheet have similar degrees of penetration. Since the PFA resin sheet has superior heat resistance and mechanical strength, it is preferable that the PFA resin sheet is employed. Although the penetration of the PTFE resin sheet is inferior to that of the PFA resin sheet, the PTFE resin sheet may be employed to constitute the sheet member 20.

The thickness of the phosphoric-acid resisting resin sheet for constituting the sheet member 20 is an important factor in terms of preventing deterioration in the heat insulating material, which is in contact with the sheet member and leakage of the phosphoric acid, which causes erosion of adjacent elements. Therefore, the inventors of the present invention investigated the relationship between the thicknesses of the phosphoric-acid resisting sheet and amounts of penetration of the phosphoric acid at 200° C.

Figure 19:
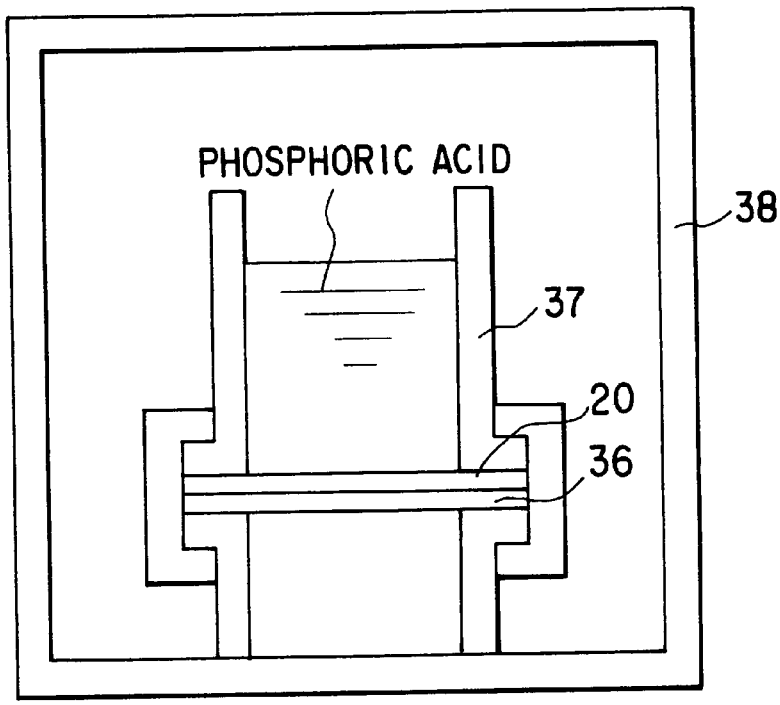
FIG. 19 is a schematic view showing the structure of an experimental apparatus for examining the relationship between thicknesses of the resin sheet and amounts of penetration of phosphoric acid.

The foregoing experiment was performed by using an apparatus structured as shown in FIG. 19. That is, the phosphoric-acid resisting sheet constituting the sheet member 20 and a phosphoric-acid absorbing material 36 were laminated. The laminate was held by a measuring cell 37, and then phosphoric acid was injected into a portion of the measuring cell 37 adjacent to the sheet member 20. Then, the overall structure was injected into a hermetic container 38, and then the hermetic container 38 was hermetically sealed. Then, the hermetic container 38 was heated to 200° C. in a drier. After the heating operation was performed for 15,000 hours, the phosphoric-acid absorbing material 36 was taken. The amount of the reacted phosphoric acid on the surface of the absorbing material was analyzed so that the amount of penetration of the phosphoric acid was obtained.

The foregoing experiment was performed such that the phosphoric-acid resisting sheet for constituting the sheet member 20 was the PFA resin sheet, the thickness of which was varied from 0.025 mm to 1.5 mm. The phosphoric acid had a concentration of 95%. The phosphoric-acid absorbing material was soft steel having a thickness of 1 mm. A fact was previously confirmed that the foregoing phosphoric-acid absorbing material was able to capture about 100% of the phosphoric acid allowed to penetrate the sheet member.

FIG. 20 shows results of the foregoing experiment. A fact was confirmed that the amount of penetration of phosphoric acid was reduced in inverse proportion to enlargement of the thickness of the phosphoric-acid resisting sheet which constituted the sheet member 20. If the thickness of the phosphoric-acid resisting sheet was 0.10 mm or smaller, the amount of penetration of the phosphoric acid was rapidly enlarged. If the thickness was 1 mm or larger, no considerable difference was observed in the amount of penetration of the phosphoric acid.

If the thickness of the heat and phosphoric acid resisting sheet is 1 mm or larger, the overall weight of the sheet member is enlarged undesirably. Therefore, the heat and phosphoric acid resisting sheet cannot easily be secured to the heat insulating member 21 which is disposed on the outside. Also the cost of the material is enlarged in substantially proportion to the weight. Therefore, the cost cannot be reduced. When the resin sheet is heated and welded, thermal conduction is unsatisfactory if the thickness is 1 mm or larger. In this case, irregular temperature distribution occurs in a direction of the thickness of the sheet. As a result, the overall body cannot uniformly be melted. That is, the resin sheet starts decomposition in portions adjacent to the heat source, while the resin sheet positioned apart from the heat source is not melted. Therefore, the sheet cannot sufficiently be melted, causing the mechanical strength of the joint portion to be decreased. Thus, there arise problems in that the sheet is broken or gas leaks through the weak portion.

Another important factor of the resin sheet with respect to the fuel cell is electric insulation between the cell body and the heat-insulating structure 22 which constitutes the gas manifold. The electric insulation is enhanced in portion to the thickness of the film. If electric breakdown voltage which is ten times the rated voltage is required in a case of a fuel cell, 2,000 volts is required. If the PFA resin sheet is employed as the phosphoric-acid resisting sheet, the thickness of the film must be 0.1 mm or larger because the insulation breakdown voltage is 20,000 volts when the thickness is 1 mm.

Therefore, the thickness of the sheet member 20 for covering the heat insulating member 21 is made to be 0.1 mm to 1 mm. Thus, a reliable gas manifold having excellent resistance against penetration of phosphoric acid and reliable electric insulation can be provided.

To join the sheet member 20 to the heat insulating member 21, the sheet member 20 is not brought into hermetic contact with the heat insulating member 21 so as to be secured as shown in FIGS. 21A and 21B. As an alternative to this, the difference in the thermal expansion between the two elements is sufficiently absorbed by somewhat enlarging the size of the sheet member 20. Thus, the sheet member 20 is loosely joined to the heat insulating member 21. That is, the sheet member 20 previously formed to have the same shape as that of the heat insulating member 21 is joined from a position adjacent to the cell body to cover the heat insulating member 21. The heat-insulating structure 22 is formed as described above so as to be joined to each of the side surfaces of the cell body together with the corner member 23. Thus, the gas manifold is constituted.

Since the sheet member 20 is loosely joined to the heat insulating member 21 as described above, the structure is able to withstand thermal expansion of the sheet occurring when the temperatures are changed by dint of start and interruption of the operation and change in the load. Since the heat insulating member 21 simply covers the heat insulating member 21, the sheet member 20 can easily be joined and removed. Since the sheet member 20 can be manufactured in an individual process, time required to manufacture the fuel cell can be shortened.

As a matter of course, at least one, that is, a plurality of the internal sheet members 20 which constitute the gas manifold according to this embodiment can be disposed. When the plural sheet members 20 are disposed, the amount of penetration of the phosphoric acid can reliably be reduced. If one of the sheet members has a pinhole, a crack or the like, the other sheet member is able to prevent penetration of the phosphoric acid. Thus, the reliability can be improved.

When the plural sheet members are employed, air layers formed among the sheet members enable a heat insulating effect to be obtained. Therefore, the thickness of the heat insulating member which is disposed on the outside can be reduced.

The corner member 23 which constitutes the gas manifold will now be described.

Figure 22A:
Figure 22B:
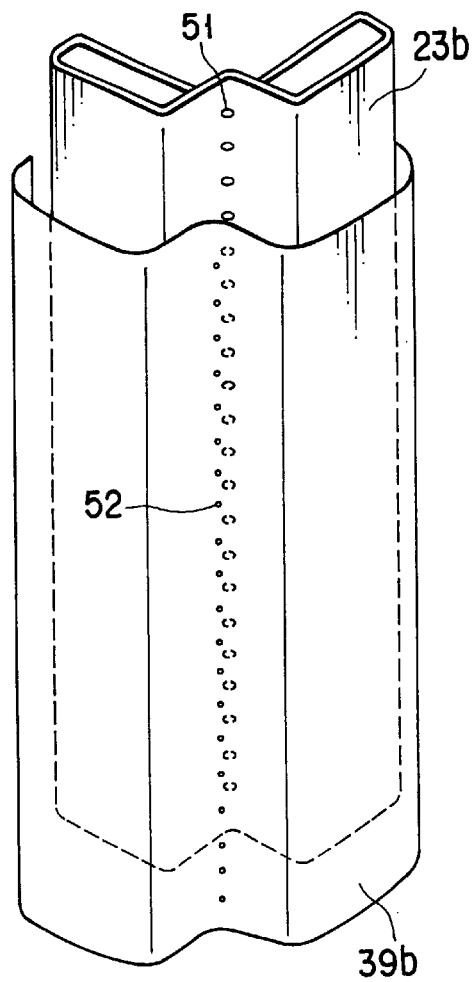

The corner member 23 which constitutes the gas manifold according to this embodiment is made of a metal material or FRP. As shown in FIGS. 22A and 22B, the inner surface (the surface adjacent to the cell body) of the corner member 23 is applied with a liner sheet 39a.

That is, FIG. 22A shows the corner channel portion 23a which is provided for the cooling plate in the portion from which an outlet pipe is not extended. The liner sheet 39a is joined to the inside portion of the metal or FRP corner channel portion 23a.

FIG. 22B shows the corner channel portion 23b which is provided for the cooling plate in the portion from which the outlet pipe is extended. A plurality of through holes 51 are formed in the metal or FRP corner channel portion 23b at a position from which the pipe is extended. Similarly, a liner sheet 39b having holes 52 smaller than the through holes is disposed at the position from which the pipe is extended.

The liner sheets 39a and 39b are made of heat and phosphoric acid resisting sheets, such as PFA resin sheets, PTFE resin sheets or FEP resin sheets. Moreover, the liner sheets 39a and 39b previously bent to fit the inner shapes of the corner channel portions 23a and 23b are loosely joined to the inner surfaces of the corner channel portions 23a and 23b.

The structure of the corner member shown in FIGS. 22C and 22D and disposed in the portion of the cooling plate from which the outlet pipe is extended has a structure which is separable horizontally along the corner of the cell stack, the cooling plate being inserted into the cell stack.

Initially, a liner sheet (not shown) having a through hole formed at the position from which the pipe is extended is allowed to penetrate the outlet pipe so as to be disposed in the corner of the cell stack. Moreover, a portion between the through hole and the outlet pipe is filled with a sealing member and thus the foregoing portion is sealed. Then, the corner member 23c having a structure which is separable horizontally such that a portion from which the outlet pipe is extended is formed into a half pipe structure is disposed to hold the pipe from right and left portions. Then, a connection bolt 64 is used to connect the corner member 23c having the structure which is separable horizontally.

As for a corner member 23d shown in FIGS. 22E and 22F, an inner sheet (not shown) is similarly allowed to penetrate the outlet pipe so as to be disposed in the corner of the cell stack. The corner member 23d having the structure which is separable horizontally and from which a portion from which the outlet pipe is extended has been cut is disposed to hold the pipe from right and left portions. Then, a connecting L-shape member 65 is used to clamp the corner member 23d.

As described above, according to this embodiment, the outlet pipe does not obstruct the operation for disposing the corner member and thus the corner member can easily be disposed. Since the separable structure is employed, the weight can be halved and the workability can significantly be improved.

When a repairing operation is performed, the pipe connected to the outlet pipe is not required to be removed when the corner member is removed. Therefore, time required to complete the repairing operation can considerably be shortened.

The second sealing member 27 shown in FIG. 22G is formed into a frame shape which is previously positioned in close contact with the corner member. Since the shape is formed into a simple frame shape, sealing can easily be performed and gas leak can satisfactorily be prevented. It is preferable that the frame shape of the second sealing member 27 is formed into a seamless shape. Since the sealing member is previously positioned in hermetic contact with the corner member, the sealing member can easily be joined.

The second sealing member 27 is hermetically fit to the corner member such that a double coated tape is, in the form of the frame, applied to the liner of the corner member. Then, the sealing member is pressed against the double coated tape so that the second sealing member 27 is hermetically fit to the corner member.

Since the corner member can be disposed at each of the four corners in a state in which the seal member is positioned hermetically, the workability can be improved.

Figure 23A:
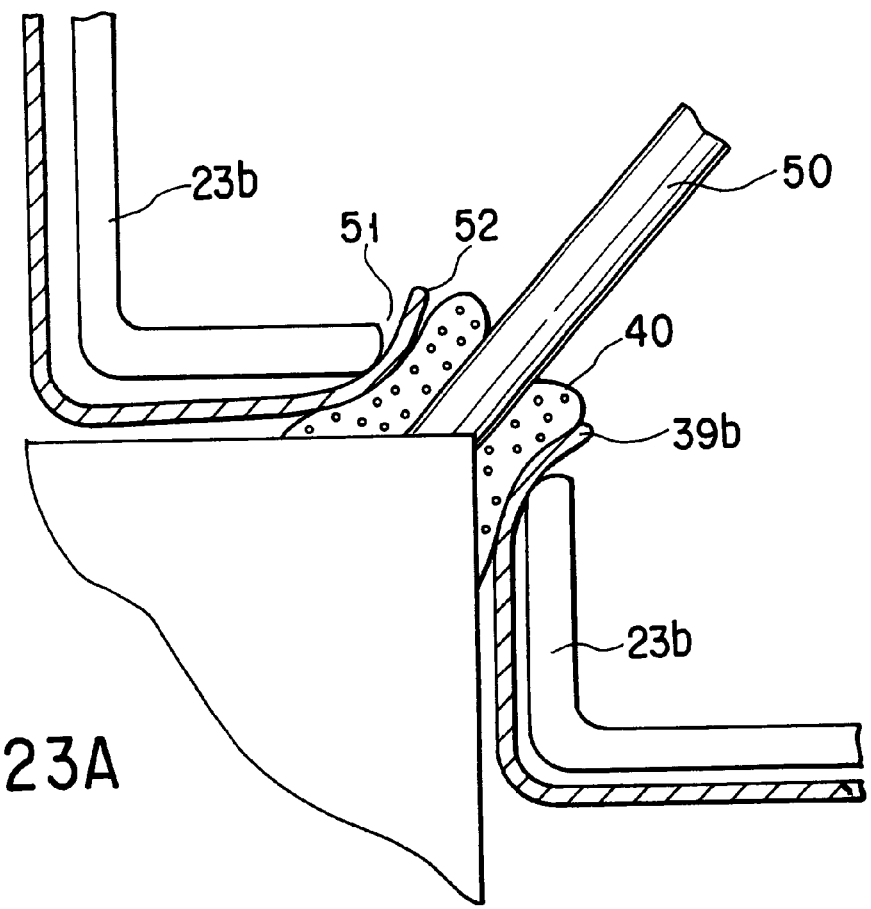
Figure 23B:
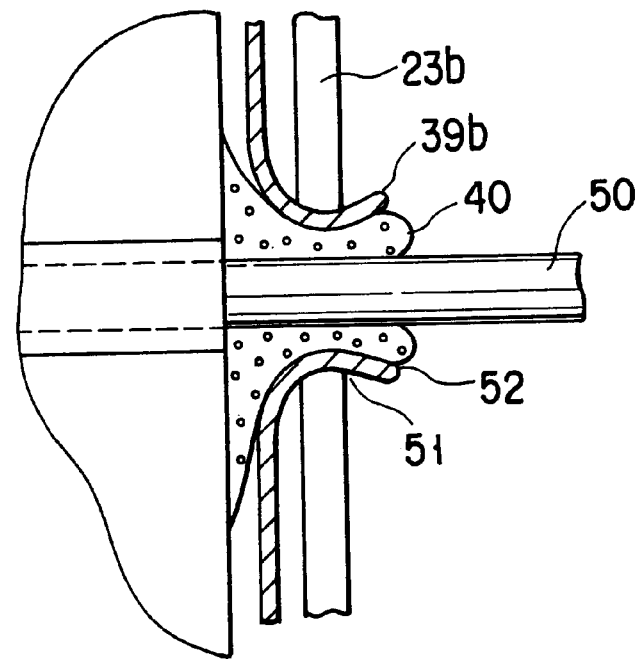

FIGS. 23A and 23B show a detailed structure of a portion including the corner channel portion 23b which is disposed adjacent to the portion from which the outlet pipe of the cooling plate is extended.

As shown in FIG. 23A, the corner member 23b has the through holes 51 at the position from which an outlet pipe 50 is extended. Moreover, the through holes 52 each having a size smaller than that of each of the through holes 51 are formed in the liner sheet 39b at the positions at which the pipe is extended. A soft sealing member 40 is disposed around the outlet pipe 50 which is inserted into the through holes 51 and 52. Note that the soft sealing member 40 is a foam rubber sealing member.

As described above, the soft sealing member 40 is disposed around the outlet pipe 50. Then, the liner sheet 39b and the corner member 23b are disposed, and then the heat-insulating structure 22 is joined finally. Then, a spring buckle is used to clamp the outer peripheral. As a result, the liner sheet 39b and the corner member 23b are pressed against the cell body so as to be secured to the cell body.

The soft sealing member 40 disposed around the outlet pipe seals the gaps among the liner sheet 39b pressed against the cell body, the through holes of the corner member 23b and the outlet pipe.

When the foam rubber sealing member is employed as the soft sealing member 40, the foam rubber sealing member reacts when the temperature of the cell has been raised to foam because of generation of gas. Thus, the gap between the through holes of the corner channel portion 23b and the outlet pipe can be sealed. Since the strength of the rubber sealing member is increased because of simultaneous vulcanization, the sealing performance can be enhanced.

Figure 23C:
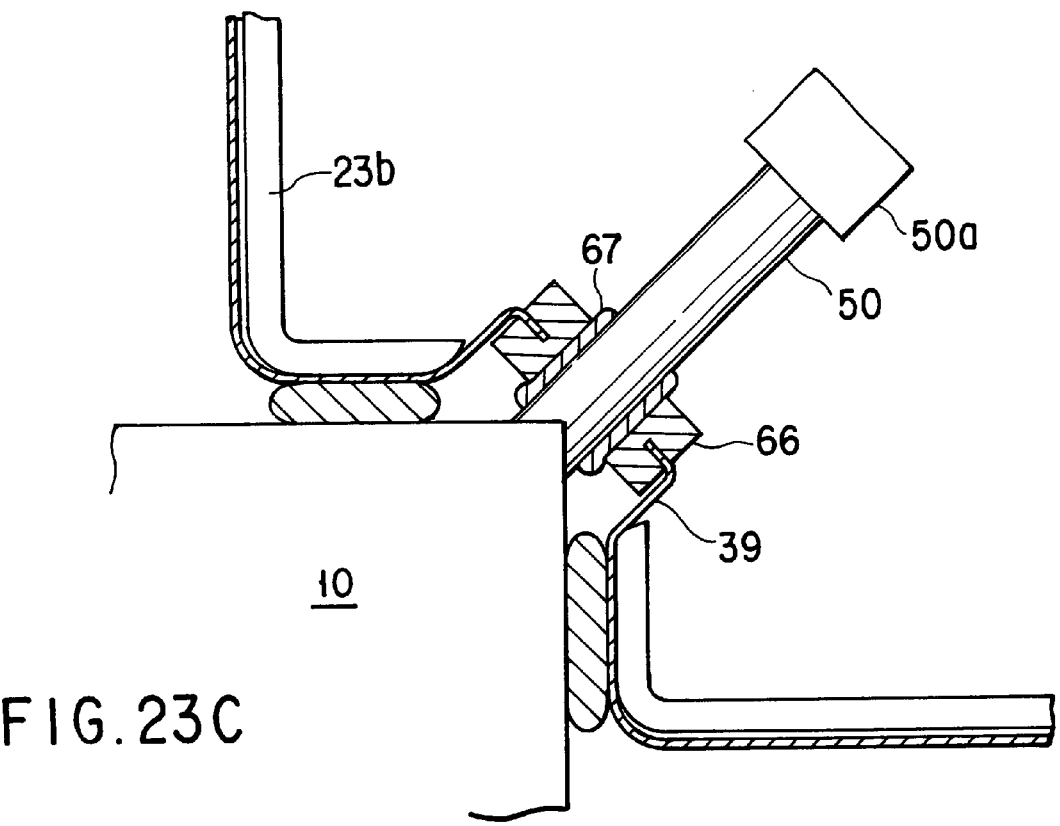
FIGS. 23C and 23D are perspective views showing a state in which a disc-like sponge rubber, which is a soft sealing member, has been joined.

The structure of a soft sealing member shown in FIG. 23C is formed such that a hole smaller than the outlet pipe is formed in the central portion of a disc-shape sponge rubber 66 made of fluorine material. Moreover, a slit is formed in the central portion in the direction of the thickness of the side surface of the disc structure, the slit being formed in the circumferential direction.

The disc-shape sponge rubber 66 is inserted into a predetermined position of the outlet pipe 50. Then, the liner sheet 39b is inserted into the outlet pipe 50. Then, the liner sheet 39b is inserted into the slit formed in the circumferential direction of the disc-shape sponge rubber 66.

As described above, according to this embodiment, the elasticity of the sponge rubber enables the gap between the outlet pipe 50 and the disc-shape sponge rubber 66 and that between the disc-shape sponge rubber 66 and the liner 39 to reliably be sealed. As a result, gas leak from the corner of the cell stack can be prevented.

Figure 23D:
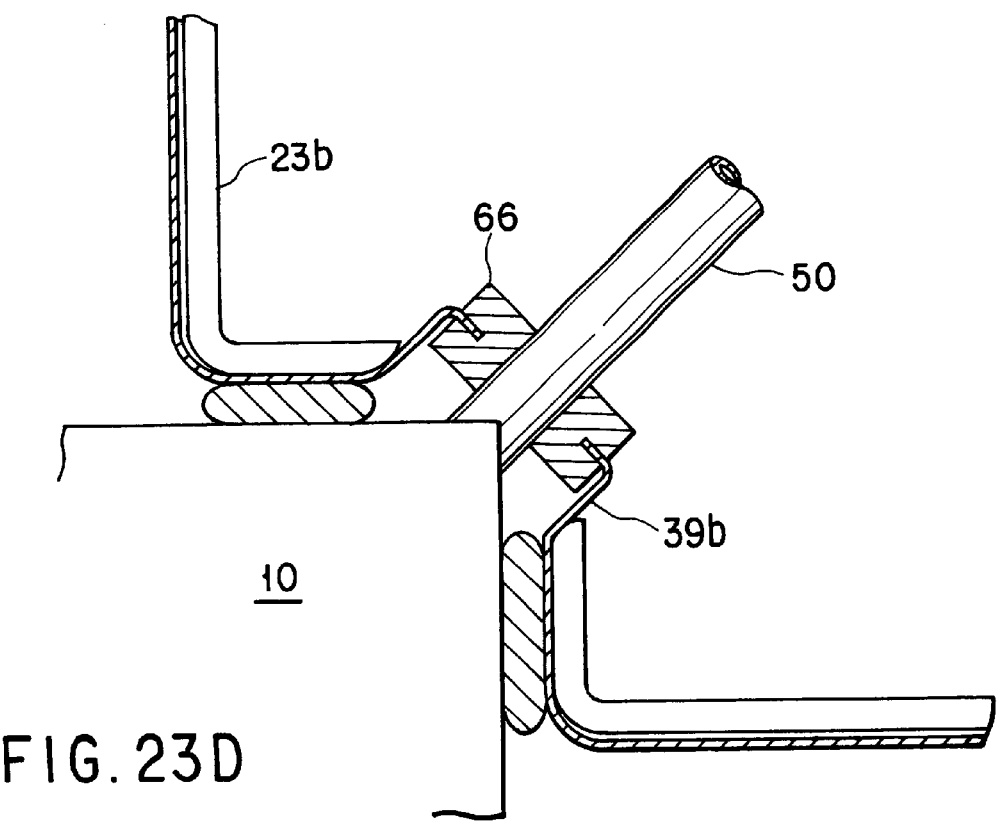

The inner diameter of a disc-shape sponge rubber 66 shown in FIG. 23D is larger than the diameter of the pipe in a quantity corresponding to the structure that a connection nipple 50a is joined to an end of the outlet pipe 50. Therefore, fluorine foam rubber 67 is wound around the position of the sealing portion.

As described above, according to this embodiment, a necessity of cutting and separating the sponge rubber for the purpose of passing the nipple can be eliminated. Therefore, the elasticity of the sponge rubber and the fluorine foam rubber 67 prevent gas leak from the gap between the outlet pipe 50 and the disc-shape sponge rubber 66.

As described above, according to this embodiment, a simple structure is required to reliably seal the gap between the through holes 51 of the corner channel portion 23b and the outlet pipe 50.

Another method of reliably sealing the gap between the through holes 51 of the corner channel portion 23b and the outlet pipe 50 will now be described.

FIGS. 24A and 24B show a liner sheet 39c of the corner channel portion 23b which is disposed in the corner from which the outlet pipe of the cooling plate is extended. That is, through holes are formed at the positions from which the pipes are extended. A sleeve 41 for the pipe is joined to each through hole. The sleeve for the pipe is welded and joined by a circular or a semicircular impulse heater.

Referring to FIG. 24D, a method of joining the liner sheet 39c subjected to a flare machining for the pipe to the outlet pipe 50 will now be described. The corner member 23b has the through holes 51 at the positions from which the pipes are extended. Also the portions of the liner sheet 39c from the pipes are extended are flare-machined. The outlet pipe 50 is inserted into a flare-machined portion 68. A sealing member 42 is disposed around the outlet pipe 50, and then the corner channel portion 23b is pressed to seal the structure.

A method of flare-machining the portion of the liner sheet 39c from which the pipe is extended will now be described.

A hole smaller than the pipe is formed at the portion of the liner sheet 39c from which the pipe is extended. Then, the liner sheet 39c is inserted into a conical male mold, and then a female mold having a conical slit is placed on the male mold. Then, the two molds are heated. The temperature is gradually raised so that a portion of the sheet adjacent to the hole in the liner sheet 39c is extended. Thus, the flare-machined portion is formed.

As described above, according to this embodiment, the flare portion can be formed without a necessity of using, for example, a method of welding two sheets. Therefore, the gap between the corner member 23b, the through hole 51 and the outlet pipe 50 can reliably be sealed.

Figure 25A:
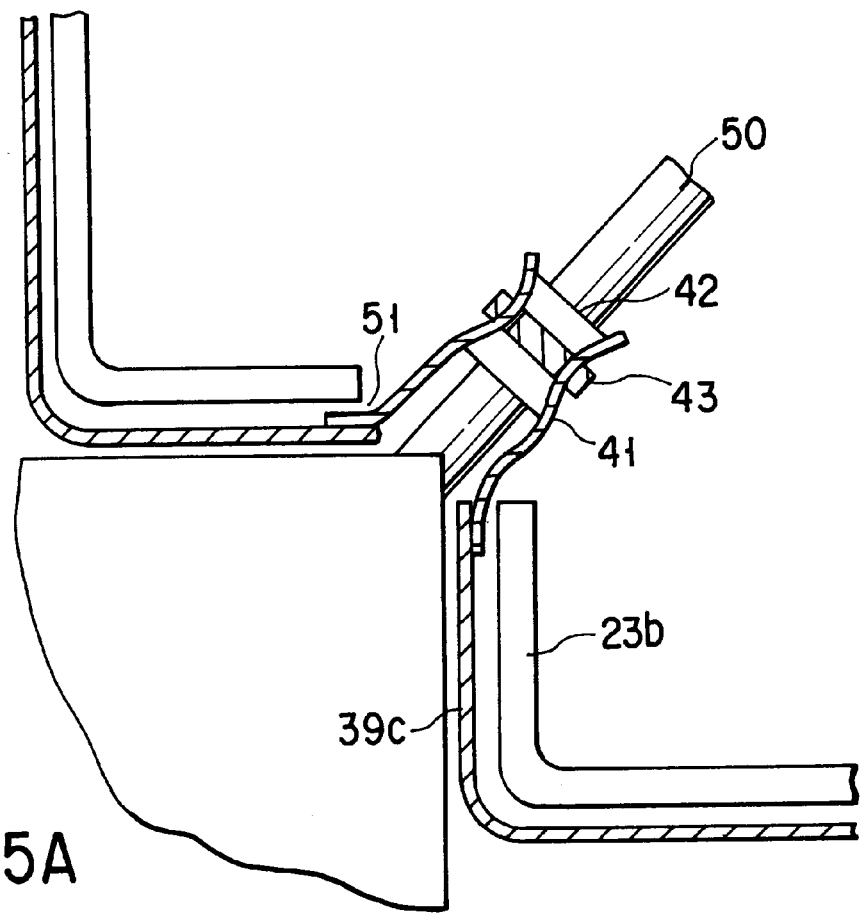
Figure 25B:
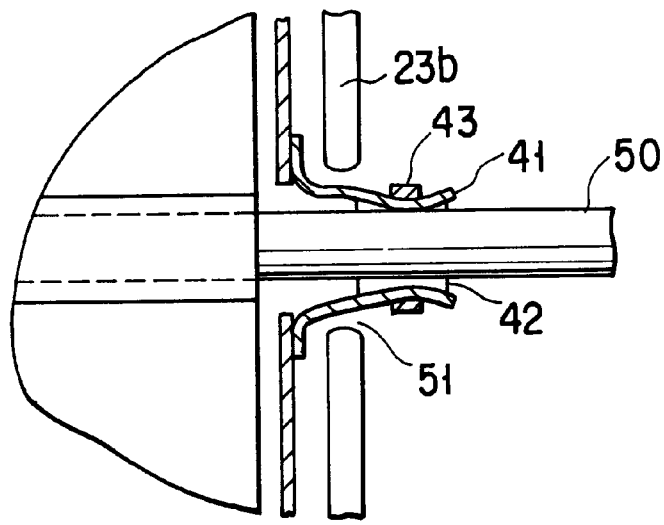

Referring to FIGS. 25A and 25B, a method of joining the liner sheet 39c having the sleeve 41 for the pipe to the outlet pipe 50 will now be described. The corner member 23b has the through hole 51 formed at the position from which the pipe is extended. The sleeve 41 for the pipe is joined to the liner sheet 39b at a similar position from which the pipe is extended. The outlet pipe 50 is inserted into the sleeve 41 for the pipe, and then the sealing member 42 is disposed around the outlet pipe 50. Then, the foregoing portion is clamped by a band 43 so that the structure is sealed.

As described above, according to this embodiment, the gaps among the through hole 51 of the corner member 23b and the outlet pipe 50 can reliably be sealed. Therefore, gas leak from the corner portion of the cell stack can satisfactorily be reduced.

Figure 26:
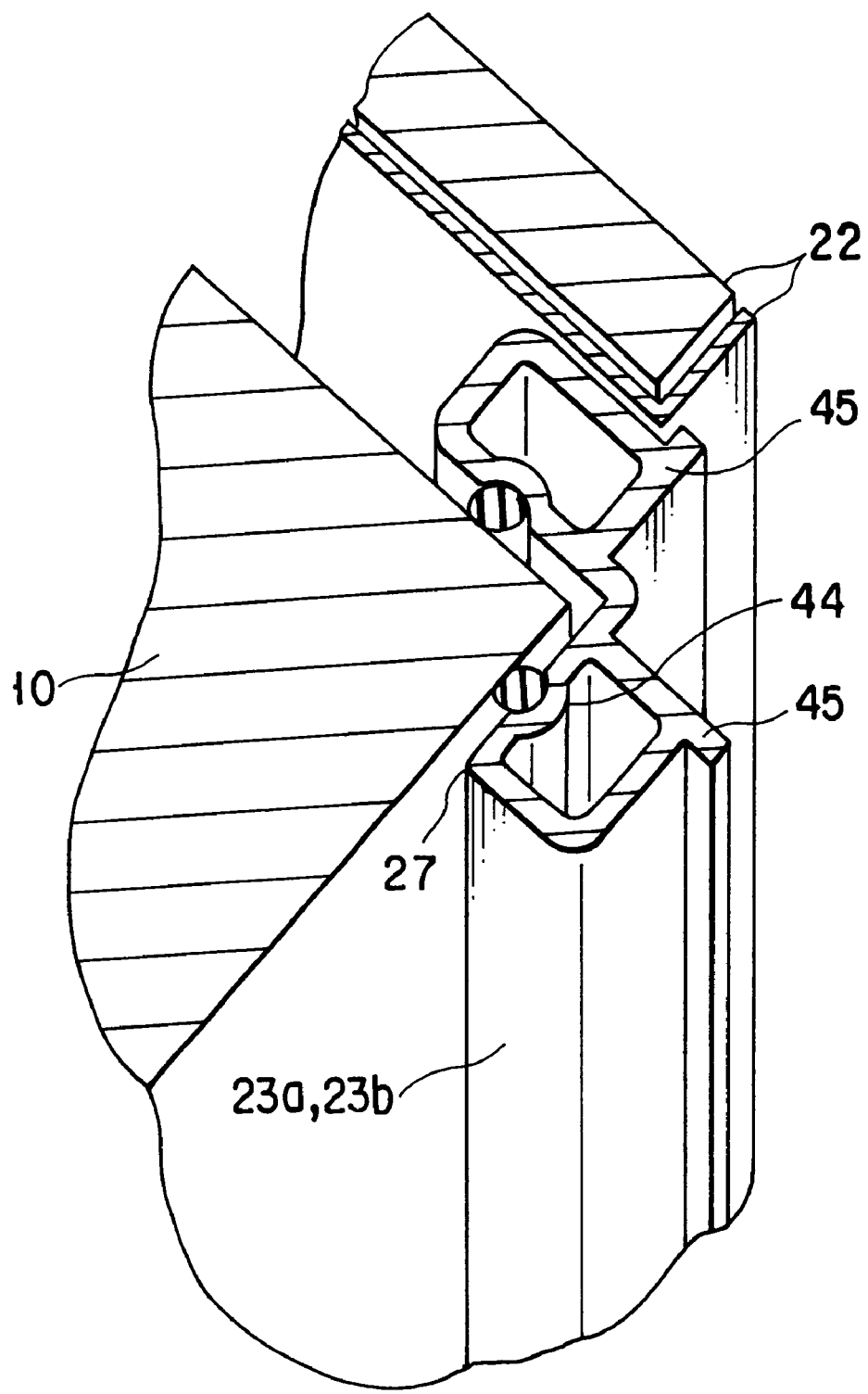
FIG. 26 is a perspective view showing another structure of the corner member.

FIG. 26 shows a modification of the corner member. Note that FIG. 26 does not show the liner sheet. A sealing groove 44 having a recess cross sectional shape is formed in the corner member 23 adjacent to the cell body. Moreover, a projection portion 45 projecting outwards is formed in the portion of the corner member 23 which is joined to the outside heat-insulating structure 22.

As a result of the foregoing structure, the second sealing member 27 which is joined between the cell stack 10 and the corner member 23 is guided by the sealing groove 44 of the corner member 23. Therefore, shift of the second sealing member 27 can be prevented. Moreover, the gap between the cell stack 10 and the corner member 23 can reliably be sealed.

The projection portion 45 formed on the outside of the corner member 23 acts as a stopper to prevent movement of the heat-insulating structure 22 when the heat-insulating structure 22 is clamped by the spring buckle. Therefore, the heat-insulating structure 22 can uniformly be clamped.

A specific example of the gas manifold according to the present invention will now be described. A PFA resin sheet (having a thickness of 0.5 mm) was employed as the internal sheet member opposing the cell stack, the PFA resin sheet being previously molded into the box-like shape having the same shape as that of the heat insulating member. The molding operation was performed such that the four corners and the piping flange sleeve were welded and joined to each other.

The external heat insulating member (having the piping hole) was rock wool having a thickness of 75 mm. The surface of the rock wool was reinforced by a plain lath. Then, the upper surface of the plain lath was covered with glass cloth, and then the heat insulating member was inserted into the heat-insulating holding frame. Note that the thermal conductivity of the rock wool insulating material was 0.044 W/mK, the density of the same was 0.15 g/cm$^3$ and the compressibility when the compressive load was 200 kg/m$^2$ was 2% or lower.

Then, the sheet member molded to have the box-like shape was fit to cover the heat insulating member so that the heat insulating structure was formed.

A heat and phosphoric acid resisting sealing member (a first sealing member) made of fluorine rubber and formed into the frame shape was, with the double coated tape, joined to a portion in which the sheet member which constituted the heat insulating structure and the corner member were in contact with each other.

On the other hand, the cell was previously stacked on the lower clamping plate. The cushion member (made of fluorine rubber) having the same shape as that of the cut portion was disposed in the cut portion of the corner portion of the lower clamping plate. Then, an iron corner member was stood erect at each of the four corners. Moreover, the upper clamping plate was similarly disposed.

The through hole is formed in the corner member from which the pipe was extended, the through hole being formed at the position from which the pipe was extended. Also the liner sheet (having a thickness of 0.5 mm and in the form of the PFA resin sheet) had a hole smaller than the through hole in the corner member, the hole being formed at the position from which the pipe was extended. The soft sealing member (foam fluorine rubber) was disposed around the opposing outlet pipe. An O-ring (constituted by covering fluorine rubber with a fluorine resin tape or a soft fluorine resin sheet) which was heat and phosphoric acid resisting and insulating sealing member was fitted in the sealing groove in the corner member.

Then, the heat-insulating structure was engaged to the corner member. That is, the lowermost portion of the heat-insulating structure was placed on the position stopper joined to the lower clamping plate. The right and left positions were located by the projecting portions provided for the corner members. Then, the outer surface was clamped by the spring buckle.

Since the gas manifold according to this embodiment had the small weight, all of the joining operations were manually completed. Moreover, time required to assemble the gas manifold was shortened by about 30% of the conventional structure.

Since the elements of the gas manifold were heat and phosphoric acid resisting sheet and low-cost heat insulating material, the iron heating-insulating-material holding frame and the iron corner members, the cost was significantly be reduced. The cost was about ½ of the conventional gas manifold and the heat insulating material.

Also the area required to install the cell body including the gas manifold was reduced by about 20% because the area corresponding to the conventional heat insulating material was omitted.

The gas manifold according to the present invention which has been assembled as described above was continuously operated for 1,000 hours at 200° C. such that the temperature was raised and the gas was allowed to flow.

As a result, gas leak was not higher than 1.10 as compared with that realized by the conventional structure. Also the heat insulation effect was similar to that obtainable from the conventional structure in which the iron gas manifold was covered with the heat insulating material.

In particular, gas leak from the corner portion, from which a large quantity of leak has taken place with the conventional structure, was completely prevented. The reason for this can be considered that one liner sheet joined to the corner member prevents gas leak from the corner member.

The gas leak from the corner portion takes place in only the corner of the four corners from which the pipe of the cooling plate is extended. This embodiment has the structure that also the above-mentioned corner is sealed such that the soft sealing member is disposed around the outlet pipe and the corner member and the liner sheet presses the soft sealing member. Since the foam rubber sealing member is employed, the foam rubber sealing member responds to rise in the temperature of the cell. When the gas is generated, the foam rubber sealing member foams to furthermore firmly seal the gap between the through hole of the corner member and the outlet pipe. Since the strength of the rubber sealing member is increased because of simultaneous vulcanization, sealing can furthermore reliably be performed. Therefore, it can be considered that leakage was prevented.

The gas manifold according to this embodiment which has the above-mentioned structure has the following effects. That is, since the sheet member 20 which is the element of the heat-insulating structure 22 which constitutes the gas manifold is a uniform sheet, phosphoric acid in the gas discharged from the cell can reliably be blocked. Thus, leakage of the phosphoric acid to the outside of the system can be prevented.

The heat insulating member 21 which is the element of the heat-insulating structure 22 is able to prevent heat radiation from the cell which is operated at high temperatures of about 200° C. Moreover, the heat insulating member 21 integrally holds the sheet member 20 so as to constitute the heat-insulating structure 22 which serves as the wall portion of the gas manifold.

Moreover, the corner member 23 constitutes the side surface of the gas manifold to maintain the stable shape of the heat-insulating structure 22 composed of the sheet member 20 and the heat insulating member 21 so that gas distribution to the cell stack is uniformed.

As described above, according to this embodiment, the heavy metal gas manifold and costly fluorine resin coating of the conventional structure are not used. Therefore, the weight and cost of the gas manifold can be realized.

As described above, according to the present invention, the light weight and low cost gas manifold can be provided. Moreover, the gas manifold having a simple structure and permitting easy inspection can be provided. In addition, gas leak from the corner portion of the cell stack can be reduced. Moreover, the gas manifold requiring a small area for installing the cell stack can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell comprising gas manifolds disposed on side surfaces of a cell stack, wherein each of said gas manifolds comprises:

plate-like heat insulating structures disposed on the side surfaces of said cell stack to oppose each other; and corner members disposed in corners of said cell stack, wherein said heat insulating structure comprises an internal sheet member and an external heat insulating member which oppose said cell stack, and said heat insulating member has a honeycomb structure, and said honeycomb structure is filled with a heat insulating material.

2. A fuel cell according to claim 1, wherein said sheet member and said heat insulating member have a flange hole through which gas is communicated, and said sheet member has a cylindrical sleeve.

3. A fuel cell according to claim 1, wherein said sheet member is formed into a plate-like shape.

4. A fuel cell according to claim 1, wherein said heat insulating member is composed of a plurality of heat-insulating-material layers made of materials having different heat resisting temperatures and strengths.

5. A fuel cell comprising gas manifolds disposed on side surfaces of a cell stack, wherein each of said gas manifolds comprises:

plate-like heat insulating structures disposed on the side surfaces of said cell stack to oppose each other and corner members disposed in corners of said cell stack, wherein said heat insulating structure comprises an internal sheet member and an external heat insulating member which oppose said cell stack, said heat insulating member is constituted by inserting a heat insulating material into a heat insulating-material holding frame, and two sides of said heat insulating material are reinforced by first reinforcing members and surfaces of said first reinforcing members are reinforced by second reinforcing members.

6. A fuel cell according to claim 5, wherein said sheet member is molded into a box-like shape to fit to a shape of a heat-insulating-material holding frame.

7. A fuel cell according to claim 5, wherein said sheet member and said heat insulating member have a flange hole through which gas is communicated, and said sheet member has a cylindrical sleeve.

8. A fuel cell according to claim 5, wherein said sheet member is formed into a plate-like shape which is larger than said heat-insulating-material holding frame.

9. A fuel cell according to claim 5, wherein said heat insulating member is composed of a plurality of heat-insulating-material layers made of materials having different heat resisting temperatures and strengths.

* * * * *